(12) United States Patent
Sato et al.

(10) Patent No.: US 7,203,597 B2
(45) Date of Patent: Apr. 10, 2007

(54) TERMINAL APPARATUS FOR ACQUIRING POSITION-RELATED CONTENT

(75) Inventors: Junichi Sato, Machida (JP); Takao Yamaguchi, Kokubunji (JP); Tomoaki Itoh, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/492,545

(22) PCT Filed: Nov. 1, 2002

(86) PCT No.: PCT/JP02/11412

§ 371 (c)(1),
(2), (4) Date: Apr. 27, 2004

(87) PCT Pub. No.: WO03/038377

PCT Pub. Date: May 8, 2003

(65) Prior Publication Data

US 2004/0260461 A1 Dec. 23, 2004

(30) Foreign Application Priority Data

Nov. 2, 2001 (JP) ............................. 2001-338782

(51) Int. Cl.
*G01C 21/00* (2006.01)
(52) U.S. Cl. .................. 701/207; 701/201; 701/208; 701/209; 340/990
(58) Field of Classification Search ........ 701/213–214, 701/216, 207–211, 202; 340/995.22, 995.24, 340/995.12, 988, 990; 455/414, 422; *G08G 1/123*
See application file for complete search history.

(56) References Cited

U.S. PATENT DOCUMENTS 5,486,822 A * 1/1996 Tenmoku et al. ...... 340/995.22
5,537,324 A * 7/1996 Nimura et al. ............... 701/208
5,765,123 A * 6/1998 Nimura et al. ............... 701/208
5,948,040 A * 9/1999 DeLorme et al. ........... 701/201
6,144,318 A * 11/2000 Hayashi et al. ......... 340/995.19
6,181,987 B1 * 1/2001 Deker et al. .................... 701/3

(Continued)

FOREIGN PATENT DOCUMENTS

JP 2000-304554 4/1997

(Continued)

OTHER PUBLICATIONS

Y. Oike et al., A 375 * 365 3D 1k frame range-finding image sensor, ISSCC 2004/ Session 6 / Imaging / 6.6, 2004.*

(Continued)

*Primary Examiner*—Cuong H. Nguyen
(74) *Attorney, Agent, or Firm*—Greenblum & Bernstein, P.L.C.

(57) ABSTRACT

A terminal apparatus is provided with a content list storage section that stores a content list storing at least one pair of an address of content related to a position and the position. A position detecting section detects a position, a specifying section which defines a region including an area forward in the traveling direction based on the detected position, and specifies a position in the defined region among positions stored in the content list. A content acquiring section that acquires content corresponding to an address associated with the specified position.

17 Claims, 17 Drawing Sheets

U.S. PATENT DOCUMENTS

| | | | |
|---|---|---|---|
| 6,304,212 B1 * | 10/2001 | Aoki et al. ............ | 342/357.13 |
| 6,321,158 B1 * | 11/2001 | DeLorme et al. ........... | 701/201 |
| 6,359,571 B1 * | 3/2002 | Endo et al. ................. | 340/988 |
| 6,381,534 B2 * | 4/2002 | Takayama et al. .......... | 701/201 |
| 6,381,537 B1 * | 4/2002 | Chenault et al. ............ | 701/209 |
| 6,401,027 B1 * | 6/2002 | Xu et al. .................... | 701/117 |
| 6,453,232 B1 * | 9/2002 | Nakamura ................. | 701/202 |
| 6,456,234 B1 * | 9/2002 | Johnson ................ | 342/357.09 |
| 6,515,614 B2 * | 2/2003 | Sakai et al. .................... | 342/70 |
| 6,615,166 B1 * | 9/2003 | Guheen et al. ............... | 703/27 |
| 6,636,802 B1 * | 10/2003 | Nakano et al. ............. | 701/208 |
| 6,798,358 B2 * | 9/2004 | Joyce et al. .......... | 340/995.24 |
| 2001/0020211 A1 * | 9/2001 | Takayama et al. .......... | 701/200 |
| 2003/0078986 A1 * | 4/2003 | Ayres et al. ................ | 709/217 |

FOREIGN PATENT DOCUMENTS

| | | | |
|---|---|---|---|
| JP | 11-65434 | | 5/1999 |
| JP | 2000-193473 | | 7/2000 |
| JP | 2001-93087 | | 6/2001 |
| WO | WO03033998 | * | 7/2004 |

OTHER PUBLICATIONS

English language Abstract of JP11-65343.

English language Abstract of JP 2001-93807.

English language Abstract of JP 2000-304554. Sakata et al. "A Proposed Location-Aware Notification Service". Information Processing Society. Japan, SIT Technical Reports on Mobile Computing and Wireless Communication, 2000-MBL-15-10, vol. 2000, No. 112, pp. 78-80. Dec. 2000. (This document is cited on p. 1 of the specification);.

Kurashima et al. Technologies for Notification Service in Location-Aware Service Platform "Locatioware", NEC Technical Report, vol. 54, No. 7, 2001. (This document is cited on pp. 1-2 of the specification).

"ITS Information Shower~All About DSRC System". DSRC System Laboratory, Create-Crews Co., Ltd; Dec. 2000 (This document is cited on p. 10 of the specification).

Sato et al. "A Caching Algorithm for Location-Aware Information Disseminated through Broadcast Media". Information Processing Society of Japan, Vol. 41, No. 9, pp. 2434-2444. Sep. 2000.

English language Abstract of JP 2000-193473.

* cited by examiner

| | 201 | 202 | 203 | |
|---|---|---|---|---|
| | ADDRESS | POSITION | SIZE | |
| | http://www.sample1.com/index.html | N34.44.26.8 E135.34.22.6 | 473 | RECORD #1 |
| | http://www.sample2.org/index.html | N35.39.26.5 E139.45.17.9 | 1152 | RECORD #2 |
| | .. | .. | .. | |

| ADDRESS | POSITION | SIZE | |
|---|---|---|---|
| http://www.sample1.com/index.html | N34.44.26.8 E135.34.22.6 | 10439 | RECORD #1 |
| http://www.sample2.org/index.html | N35.39.26.5 E139.45.17.9 | 5460 | RECORD #2 |
| .. | .. | .. | |

| ADDRESS | POSITION | SIZE | |
|---|---|---|---|
| http://www.sample1.com/index.html | N34.44.26.8 E135.34.22.6 | 473 | RECORD #1 |
| http://www.sample1.com/images/photo1.jpg | N34.44.26.8 E135.34.22.6 | 4755 | RECORD #1-1 |
| http://www.sample1.com/images/photo2.jpg | N34.44.26.8 E135.34.22.6 | 5211 | RECORD #1-2 |
| http://www.sample2.org/index.html | N35.39.26.5 E139.45.17.9 | 1152 | RECORD #2 |
| http://www.sample2.org/image1.jpg | N35.39.26.5 E139.45.17.9 | 2153 | RECORD #2-1 |
| http://www.sample2.org/image2.jpg | N35.39.26.5 E139.45.17.9 | 2155 | RECORD #2-2 |
| .. | .. | .. | |

153

CONTENT #1
```
<content>
    <url>http://www.sample1.com/index.html</url>  ~1581
    <location>N34.44.26.8E135.34.22.6</location>  ~1582
    <size>473 </size>  ~1583
</content>
```

CONTENT #2
```
<content>
    <url>http://www.sample2.org/index.html</url>
    <location>N35.39.26.5E139.45.17.9</location>
    <size>1152 </size>
</content>
```

FIG.10

TERMINAL APPARATUS FOR ACQUIRING POSITION-RELATED CONTENT

TECHNICAL FIELD

The present invention relates to a terminal apparatus which is mounted on a mobile unit and used to present content related to a position.

BACKGROUND ART

In recent years, with improvement of wireless communication networks including mobile telephone networks, service has become widespread that provides content to a terminal apparatus which is mounted and used on a mobile unit such as a car. It is preferable that the content to provide to the terminal apparatus mounted on a mobile unit is content related to positions through which the mobile unit passes.

For example, a technique called "LOCATIONWARE" is known, as a conventional technique to present to a terminal apparatus the content related to a position which a mobile unit passes through. "LOCATIONWARE" is described in Documents 1 and 2 as described below.

Document 1: Sakata, et al. "A Proposed "Location-aware Notification Service" Information Processing Society Japan, SIG Technical Reports on Mobile Computing and Wireless Communication, 2000-MBL-15-10, Vol.2000, No.112, pages 78–80, December, 2000.

Document 2: Kurashima, et al. "Technologies for Notification Service in Location-aware Service Platform "LOCATIONWARE", NEC Technical Report, Vol.54, No.7, 2001.

In the technique, a server receives a current position and maximum cache amount of a terminal apparatus from the terminal apparatus. The server sets an acquisition range (cache range) in the vicinity of the received position of the terminal apparatus, and retrieves information (content) related to a position in the acquisition range from a position-related information database. The acquisition range is set so that the total amount of content data in the acquisition range is within the maximum cache amount.

The server transmits the retrieved content data and information of the acquisition range to the terminal apparatus. Thus, the content related to the current position is presented to a user of the terminal apparatus.

Communications between a server and terminal in the conventional technique will be described below with reference to FIG. 1. FIG. 1 illustrates communications between the server and terminal apparatus in the conventional technique.

In time period B1, terminal apparatus 1702 transmits position information of terminal apparatus 1702 to server 1701. Next, in time period B2, server 1701 calculates an acquisition range based on the received position information, and retrieves content data associated with the calculated acquisition range. In time period B3, server 1701 transmits information of the acquisition range to terminal apparatus 1702. In time period B4, server 1701 transmits the content data to terminal apparatus 1702.

It is necessary to present content related to a position at suitable timing to a terminal apparatus mounted on a mobile unit whose position moves with the passage of time.

When content related to a position is presented after a mobile unit has passed through the position, the presented content does not related to a position of the terminal apparatus, and has little value.

Further, when loads on the server are large due to concentrated access on the server, it takes a time for the server to retrieve content data. Therefore, in the conventional technique as disclosed in the above-mentioned documents, it happens that the mobile unit has moved during a period of time the server retrieves the content data, and the content is not presented to the terminal apparatus at appropriate timing.

Timing relating to communications between server 1701 and terminal apparatus 1702 will be described below specifically with reference to FIG. 2. FIG. 2 shows timing relating to communications between server 1701 and terminal apparatus 1702 in the conventional technique.

Time axis 1710 shows timing relating to communications between server 1701 and terminal apparatus 1702 in the case where access is not concentrated on the server.

In this case, terminal apparatus 1702 starts transmission (B1) of position information to server 1701 at time t=0, and server 1701 completes transmission (B4) of content data to terminal apparatus 1702 before time 1705.

Time 1705 is the time desired to display the content data to terminal apparatus 1702, and for example, the time the mobile unit mounted with the terminal apparatus passes through the position in relation to the content data.

In the timing indicated on time axis 1710, it is possible to display the content data to terminal apparatus 1702 appropriately.

Time axis 1711 shows timing relating to communications between server 1701 and terminal apparatus 1702 in the case were access is concentrated on the server.

In this case, terminal apparatus 1702 starts transmission (B1) of position information to server 1701 at time t=0, and server 1701 completes transmission (B4) of content data to terminal apparatus 1702 after time 1705.

In the timing indicated on time axis 1711, transmission of content data to terminal apparatus 1702 is not completed at time 1705. Therefore, it is not possible to present the content data to terminal apparatus 1702 at appropriate timing.

This is because concentrated access on server 1701 increases time required for server 1701 to calculate an acquisition range and retrieve contend data by time 1704.

In particular, when a mobile unit mounted with a terminal apparatus moves at high speed, a possibility is high that content data is not presented at appropriate timing due to the fact that the time increases required for server 1701 to calculate an acquisition range and retrieve the contend data.

DISCLOSURE OF INVENTION

It is an object of the present invention to provide a terminal apparatus capable of reducing loads on a server from which the apparatus acquires content data.

In the present invention, the terminal apparatus stores a content list storing at least one pair of an address of content related to a position and the position, detects a current position, defines a region including an area forward in the traveling direction based on the detected position, specifies a position in the defined region among positions stored in the content list, and acquires content associated with the specified position using an address associated with the specified position.

By this means, the server from which the content data is acquired does not need to perform content retrieval based on the position. Accordingly, it is possible to reduce loads on the server from which content data is acquired.

BRIEF DESCRIPTION OF DRAWINGS

FIG. 7 is a chart showing an example of a data structure of a content list according to the above embodiment;

FIG. 8 is a chart showing another example of the data structure of the content list according to the above embodiment;

FIG. 9 is a chart showing still another example of the data structure of the content list according to the above embodiment;

FIG. 10 shows the content list represented in XML according to the above embodiment;

BEST MODE FOR CARRYING OUT THE INVENTION

Figure 3:
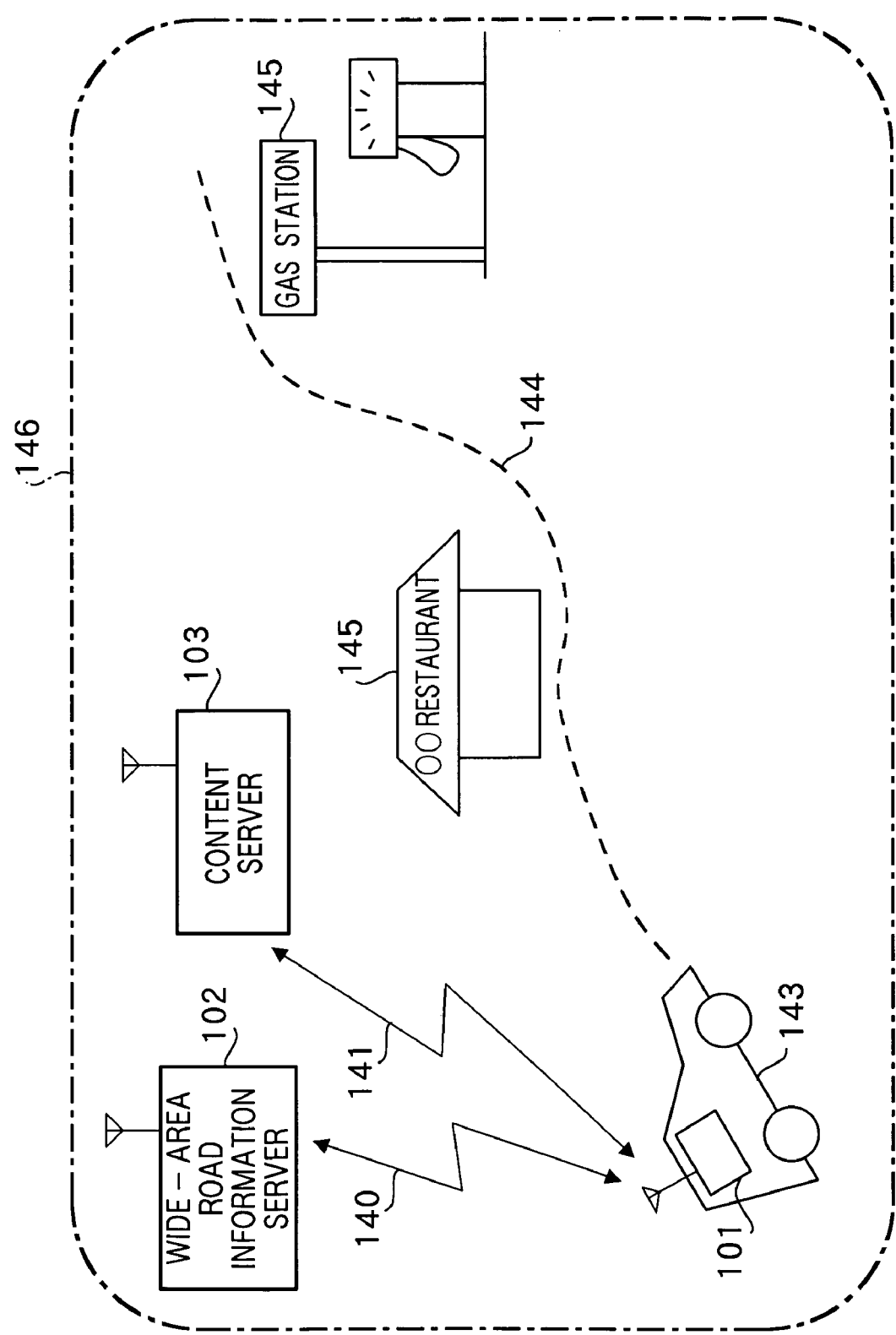
FIG. 3 is a view schematically showing a mode where a terminal apparatus is used according to the present invention.

A mode where a terminal apparatus according to the present invention is used will be described first with reference to FIG. 3. FIG. 3 is a view schematically showing the mode where the terminal apparatus is used according to the present invention.

Terminal apparatus 101 is mounted and used on mobile unit 143. Mobile unit 143 is, for example, a car, motorbike, bicycle, etc.

Mounting terminal apparatus 101 on mobile unit 143 means both that mobile unit 143 is provided with terminal apparatus 101, and that a user brings portable terminal apparatus 101 in mobile unit 143 to use therein. When a user moves by walk while carrying terminal apparatus 101, the user is regarded as a mobile unit.

Terminal apparatus 101 is, for example, a car navigation system with communication function, PDA (Personal Data Assist), notebook personal computer or the like. Further, terminal apparatus 101 may be a portable communication terminal such as a cellular telephone and PHS. Furthermore, terminal apparatus 101 may have the function of broadcast reception terminal such as TV broadcast and radiobroadcast.

Mobile unit 143 moves along path 144. Path 144 may be planned beforehand or not planned. Facilities 145 are present at positions near path 144.

FIG. 3 shows a restaurant and gas station as examples of facilities 145. As a matter of course, facilities 145 are not limited to the aforementioned examples. Facilities 145 may be shopping facilities, sightseeing Facilities and soon, and are only required to have content desired to present to users (for example, a driver and/or passenger of mobile unit 143).

Mobile unit 143 moves inside predetermined region 146. For example, the region 146 is a nation, Kanto area, Kansai are, prefecture, city, town or village. Further, the region 146 may be a specific area determined independently of governmental classification. Furthermore, when path 144 is planned in advance, region 146 may be determined to a region around path 144.

Terminal apparatus 101 is connected to wide-area road information server 102 by wireless communication path 140. Terminal apparatus 101 is further connected to content server 103 by wireless communication path 141.

Wide-area road information server 102 and content server 103 are, for example, server computers with arbitrary configurations.

Wireless communication paths 140 and 141 are, for example, cellular telephone channel, PHS channel, wireless LAN channel, and DSRC.

In addition, DSRC stands for Dedicated Short Range Communications (local-area communications), and is a communication system currently used in the automatic toll collection system of toll road. DSRC is specifically described in "ITS Information Shower~All About DSRC system", DSRC System Laboratory, Create-Crews Co., Ltd.

It is not indispensable that terminal apparatus 101 is directly connected to wide-area road information server 102 via wireless communication path 140. Any network (for example, the Internet) and/or wired communication path may be present between terminal apparatus 101 and wide-area road information server 102 in addition to wireless communication path 140. As in connection between terminal apparatus 101 and wide-area road information server 102, it is not indispensable that terminal apparatus 101 is connected to content server 103 via wireless communication path 141.

Content server 103 transmits content data (not shown in FIG. 3, see FIG. 6) to terminal apparatus 101.

The content data expresses content related to positions of facilities 145. For example, such content may be advertising information of facilities 145. Content may be road information or sightseeing information that is not related to facilities 145. The content is in relation to a position (for example, position in which each of facilities 145 is present) inside predetermined region 146.

Terminal apparatus 101 displays the content data that expresses such content.

Figure 4:
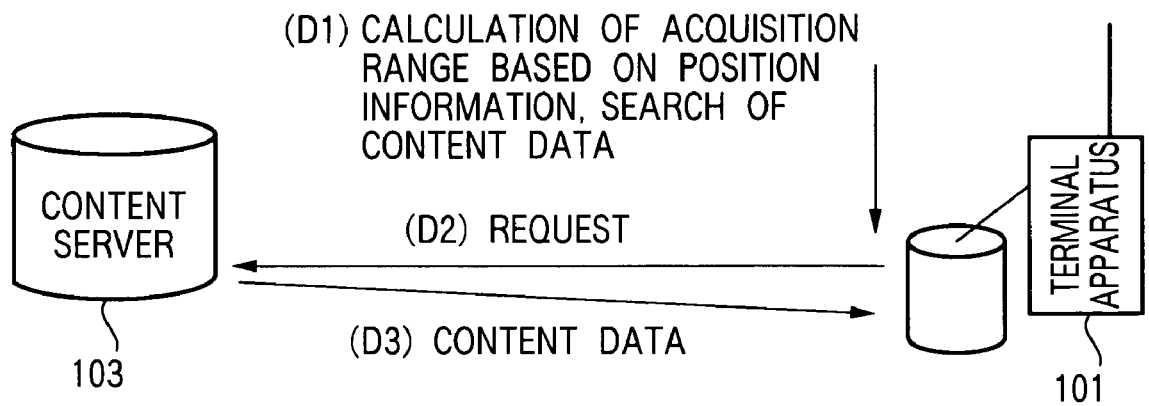
FIG. 4 is a view illustrating communications between a content server and a terminal apparatus of the present invention.

The principal of the present invention will be described below with reference to FIG. 4. FIG. 4 is a view illustrating communications between content server 103 and terminal apparatus 101 of the present invention.

In time period D1, terminal apparatus 101 calculates an acquisition range (content data acquisition region) of content data based on position information of terminal apparatus 101, and searches a content list for content data related to a position in the content data acquisition region.

Next, in time period D2, terminal apparatus 101 transmits a request for the searched content data to content server 103.

In time period D3, content server 103 transmits the content data to terminal apparatus 101.

Figure 5:
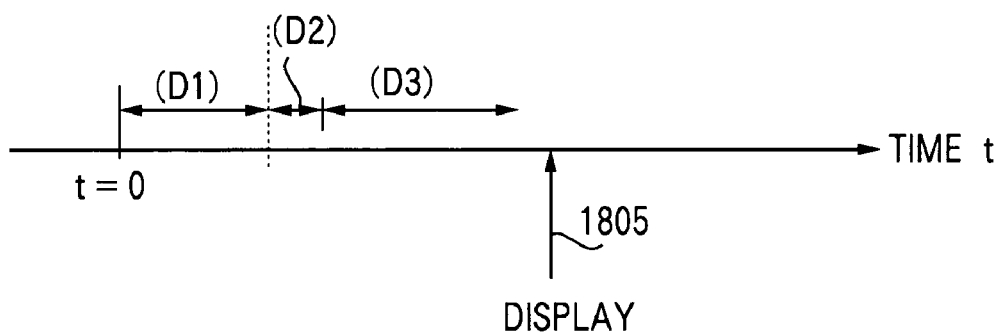
FIG. 5 is a view illustrating timing relating to communications between the content server and the terminal apparatus of the present invention.

Timing relating to communications between content server 103 and terminal apparatus 101 of the present invention will be described below with reference to FIG. 5. FIG. 5 is a view illustrating timing relating to the communications between content server 103 and terminal apparatus 101 of the present invention.

First, at time t=0, terminal apparatus 101 starts calculation of an acquisition range and search of content data, and the server 103 has completed transmission of the content data to terminal apparatus 101 before time 1805.

Time 1805 is the time desired to display the content data.

Thus, in the present invention, terminal apparatus 101 performs calculation of an acquisition range and search. Accordingly, even when access is concentrated on content server 103, a period of time does not extend during which calculation of an acquisition range and search is performed. Accordingly, terminal apparatus 101 is capable of displaying the content data appropriately at time 1805.

One embodiment of the present invention will be described specifically below with reference to FIGS. 6 to 22. In this specification, the same reference numerals indicate the same structural elements, and overlapping descriptions may be omitted.

Figure 6:
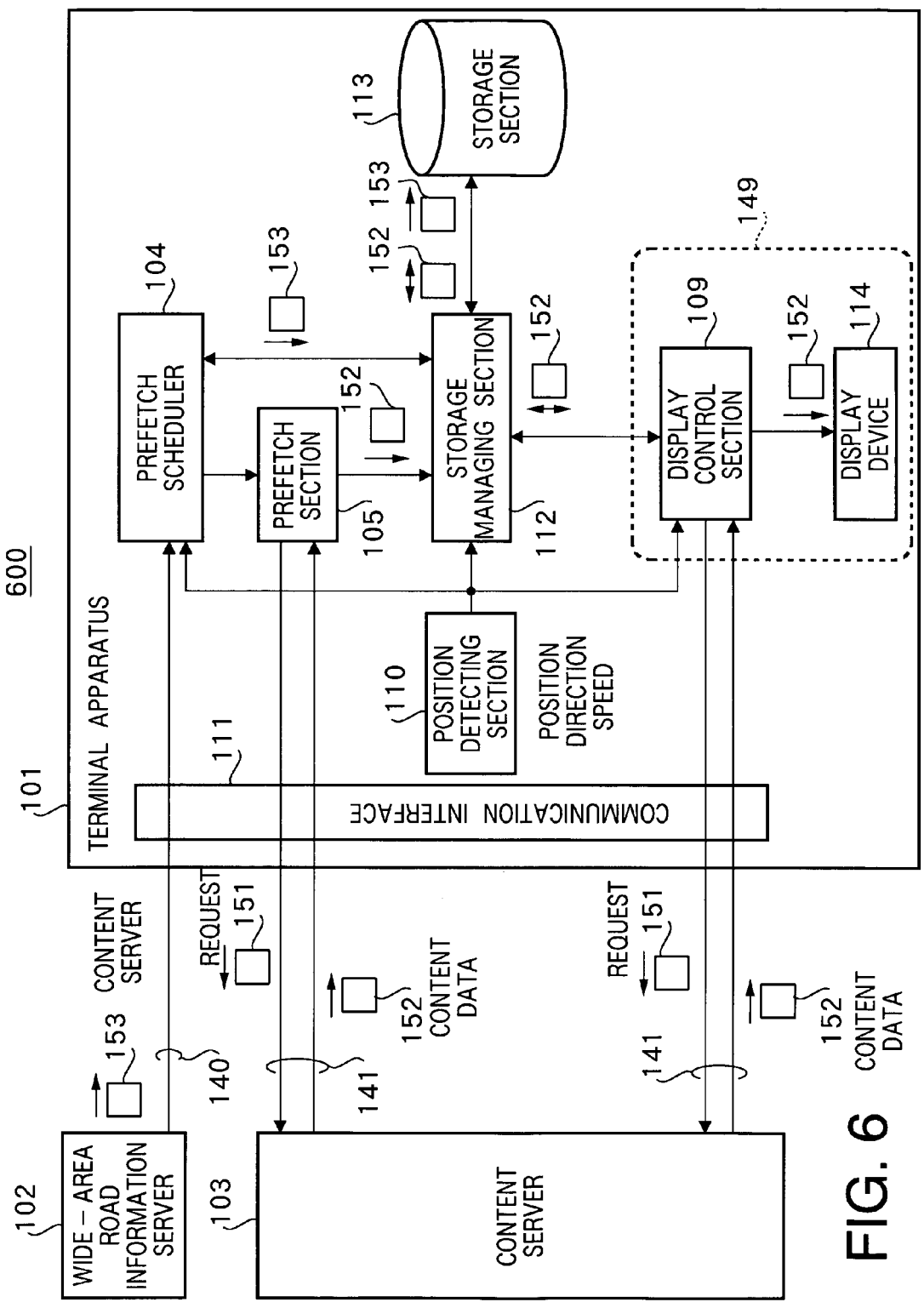
FIG. 6 is a block diagram illustrating a configuration of a content distribution system including a terminal apparatus according one embodiment of the present invention.

A configuration of terminal apparatus 101 according to the above embodiment will be described below with reference to FIG. 6. FIG. 6 is a diagram illustrating a configuration of content distribution system 600 including terminal apparatus 101.

Terminal apparatus 101 has prefetch scheduler 104, prefetch section 105, display control section 109, position detecting section 110, communication interface 111, storage managing section 112, display device 114 and storage section 113.

Communication interface 111 communicates with wide-area road information server 102 via wireless communication path 140, and further communicates with content server 103 via wireless communication path 141.

Position detecting section 110 (detecting section) detects a position of mobile unit 143 (FIG. 3). Position detecting section 110 further detects a moving direction and moving speed of the unit 143, etc.

Position detecting section 110 is, for example, a GPS (Global Positioning System) sensor. Further, position detecting section 110 may be any input device which presents a screen of a map to a user, and detects a position designated by the user on the presented screen of the map as a position of mobile unit 143. Position detecting section 110 may operate in conjunction with a car navigation system (not shown).

Prefetch scheduler 104 acquires content list 153 from wide-area road information server 102 via communication interface 111.

Figure 1:
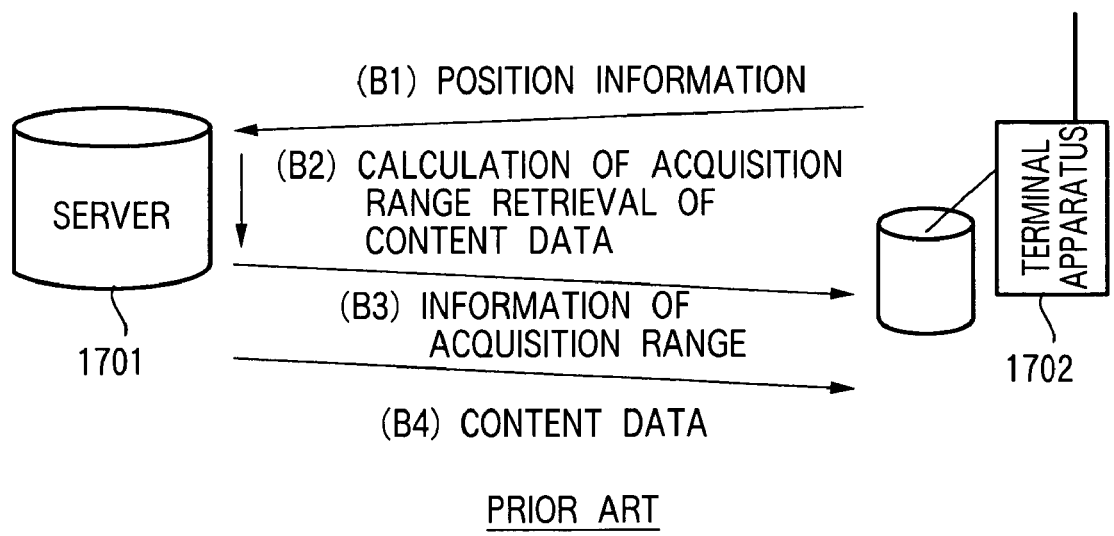
FIG. 1 is a view illustrating communications between a server and a terminal apparatus in the conventional technique.
Figure 2:
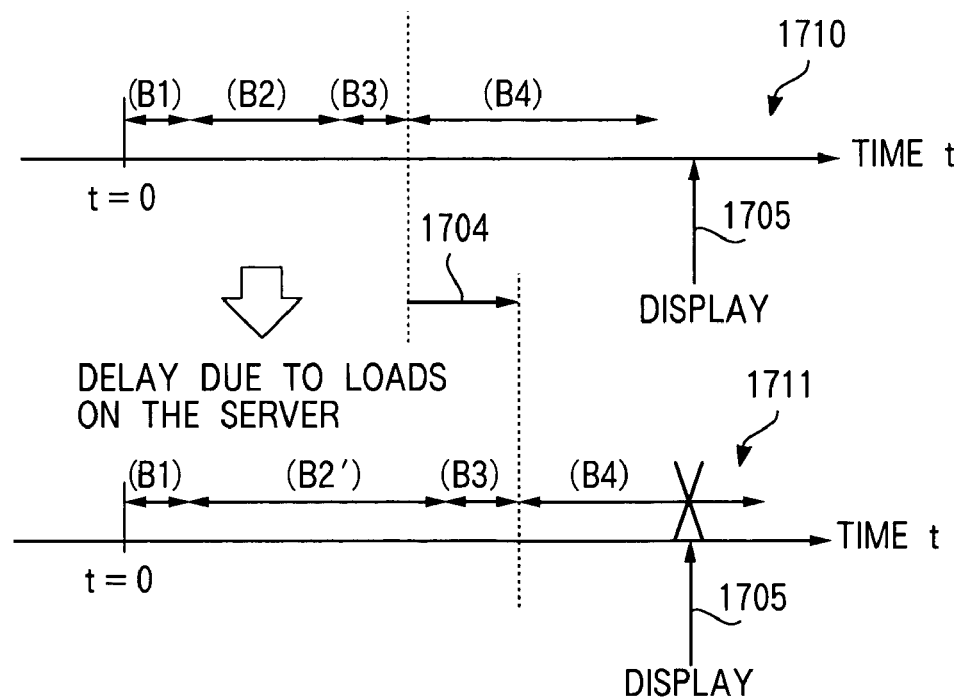
FIG. 2 is a view illustrating timing relating to communications between the server and the terminal apparatus in the conventional technique.

Content list 153 is, for example, a table that associates a position inside region 146 (see FIG. 1) with an address of content data 152 that expresses content related to the position.

Specific examples of content list 153 will be described later with reference to FIGS. 7 to 9.

Prefetch section 105 acquires contend data 152 that expresses the content from content server 103 via communication interface 111.

Based on content list 153, prefetch scheduler 104 controls the timing at which prefetch section 105 acquires content data 152.

Storage section 113 stores content data 152 acquired from content server 103. Storage section 113 is, for example, a hard disk, or may be any memory.

Storage managing section 112 manages content data 152 stored in storage section 113.

Display device 114 displays content data 152 stored in storage section 113. Based on content list 153, display control section 109 controls timing at which display device 114 displays content data 152.

Used as display device 114 is any type of display device corresponding to the type of content data 152. When content data 152 expresses video, any type of video display device is used as display device 114. When content data 152 expresses audio, any type of audio replay device is used as display device 114.

In addition, any type of presentation device may be used, instead of display device 114. The presentation device includes a printer, etc.

Content list 153 will be described below with reference to FIG. 7. FIG. 7 is a chart showing an example of a data structure of content list 153.

Content list 153 is stored in storage section 113 (FIG. 6), and receives access from prefetch scheduler 104 and display control section 109. Thus, storage section 113 has the function as a content list storage section that associates a position in region 146 in relation to content with an address of content data 152 expressing the content related to the position to store.

Content list 153 has record #1 and record #2. Each record corresponds to a single item of content data. Each record includes "address" field 201, "position" field 202 and "size" field 203.

"Address" field 201 stores an address of content data 152. The address of content data 152 indicates, for example, a storage location of the content in content server 103 (FIG. 6).

Further, when a network such as the Internet exists between terminal apparatus 101 and content server 103, an address of content data 152 is an address for uniquely specifying a storage location of content data 152 on the network, for example, a URL address. In this case, the address is information for specifying content server 103 on the network. The URL address is information indicated by "protocol name+host name+directory name+file name". The host name is a name assigned to content server 103.

In the example as shown in FIG. 7, the host name of the content data corresponding to record #1 is "www.sample1.com", and the host name of the content data corresponding to record #2 is "www.sample2.org". This means that different servers store the content data corresponding to record #1 and the content data corresponding to record #2.

Thus, in the present invention, since terminal apparatus 101 performs search of content data, different items of content data may be stored in different content servers. It is thereby possible to avoid concentration of access on a single content server, and to further reduce loads on the signal content server.

In the example as shown in FIG. 7, an address of a top page of content data 152 is described in "address" field 201.

When content data 152 includes part of images or the like, prefetch scheduler 104 (FIG. 6) that has acquired content list 153 obtains an address of the part by analyzing the top page.

"Position" field 202 stores a position inside region 146 (FIG. 3) to which is related the content expressed by content data 152. In the example as shown in FIG. 7, the position inside region 146 is represented by the latitude and longitude.

In addition, a mode for representing a position inside region 146 is not limited to the foregoing.

Hereinafter, a position inside region 146 to which content is related (i.e. a position inside region 146 to which is related content data expressing the content) is referred to as a "content position" in this specification.

"Size" field 203 stores a size of content data 152. In the example as shown in FIG. 7, "size" field 203 stores the size of the top page.

Thus, content list 153 is a table that associates at least one position (field 202) inside region 146 (FIG. 3) with an address (field 201) of each content data related to the at least one position to define.

Content list 153 is stored in storage section 113 (FIG. 6). In other words, storage section 113 functions as a table storage section for storing content list 153 (table).

In addition, it is not indispensable that content list 153 has "size" field 203.

Content list 153 is not limited to the example in FIG. 7. Another example of content list 153 will be Described below with reference to FIG. 8. FIG. 8 is a chart showing another example of the data structure of content list 153.

Content list 153 as shown in FIG. 8 is different from content list 153 as shown in FIG. 7 in a value stored in "size" field 203.

In the example of content list 153 as shown in FIG. 8, "size" field 203 stores the total size of the size of the top page and the size of all parts contained in content data 152.

In this case, only by referring to content list 153, prefetch scheduler 104 is capable of estimating the time required for acquiring content data 152.

Still another example of the data structure of content list 153 will be described below with reference to FIG. 9.

In the example of content list as shown in FIG. 9, respective addresses and sizes of parts contained in content data 152 are described in content list 153. Specifically, in records #1-1, #1-2, #2-1 and #2-2 are described respective addresses and sizes of the parts.

In this case, only by referring to content list 153, prefetch scheduler 104 is capable of obtaining the respective addresses and sizes of parts contained in content data 152.

Content list 153 described with reference to FIGS. 7 to 9 are represented in any given format. Content list 153 is described, for example, in XML (extensible Markup Language). XML is a language of which specifications are determined by World Wide Web Consortium. World Wide Web Consortium is described in a web page of "http://www.w3.org".

An example of representing content list 153 as shown in FIG. 7 in XML will be described below with reference to FIG. 10.

As shown in FIG. 10, an address of content data 152 is described in a portion (line 1581) between tag <url> and tag </url> of content list 153. A position inside region 146 (FIG. 3) in relation to content expressed by content data 152 is described in a portion (line 1582) between tag <location> and tag </location> of content list 153. A size of content data 152 is described in a portion (line 1583) between tag <size> and tag </size> of content list 153. Information indicative of an item of content is described in a portion (content #1) between tag <content> and tag </content> of content list 153. Content #1 corresponds to record #1 (FIG. 7), while content #2 corresponds to record #2 (FIG. 7).

Content data 152 is not limited in representation to XML. Content data 152 maybe represented in HTML (Hyper Text Markup Language). HTML is also a language whose specifications are determined by World Wide Web Consortium.

Figure 11:
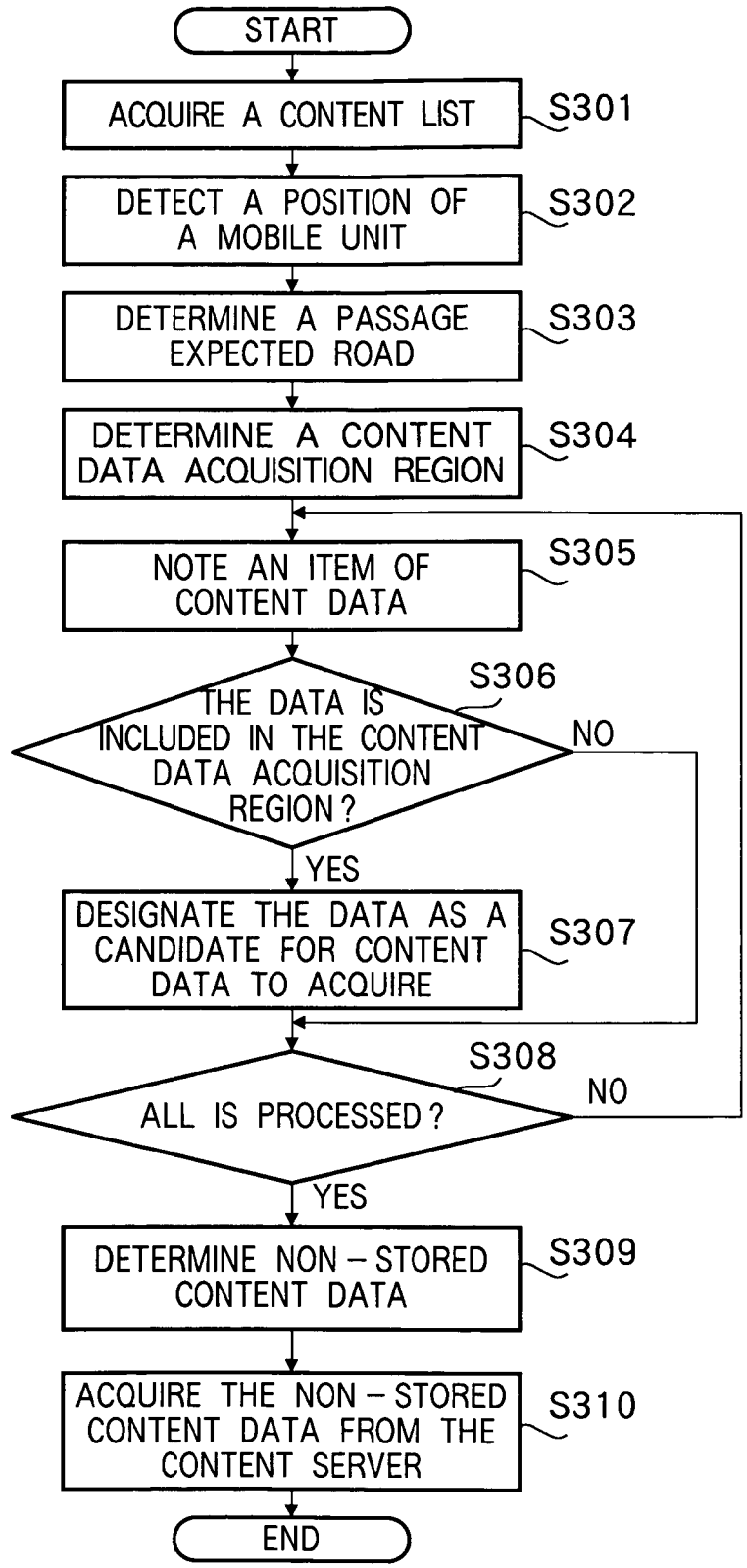
FIG. 11 is a flowchart for the terminal apparatus to acquire content data according to the above embodiment.

Processing for prefetch scheduler 104 to acquire content data 152 will be described below with reference to FIG. 11. FIG. 11 is a flowchart illustrating control of the timing for terminal apparatus 101 to acquire content data 152.

The processing as illustrated in FIG. 11 is repeated at predetermined time intervals always during a period of time mobile unit 143 is moving. Further, the processing as illustrated in FIG. 11 may be repeated whenever mobile unit 143 moves a predetermined distance.

First, prefetch scheduler 104 acquires content list 153 from wide-area road information server 102 (step S301)

Prefetch scheduler 104 may acquire content list 153 on broadcast or on demand.

In the case where prefetch scheduler 104 acquires content list 153 on broadcast, wide-area road information server 102 (FIG. 6) broadcasts content list 153 so as to cover region 146 (FIG. 3). Prefetch scheduler 104 receives the broadcast and thereby acquires content list 153. The broadcast may be data broadcast such as digital broadcast, for example.

In the case where prefetch scheduler 104 acquires content list 153 on demand, for example, at the time mobile unit 143 (FIG. 3) enters region 146, prefetch scheduler 104 transmits a request for content list 153 to wide-area road information server 102. Wide-area road information server 102 transmits content list 153 to terminal apparatus 101 in response to the request from prefetch scheduler 104, and prefetch scheduler 104 receives communications and thereby acquires content list 153.

Prefetch scheduler 104 may acquire content list 153 by reading the list from an arbitrary storage medium (for example, flexible disk). In this case, wide-area road information server 102 (FIG. 3) is not needed.

Thus, prefetch scheduler 104 functions as a table acquiring section that acquires content list 153 (table) in step 301.

Step S301 is only required to be performed once at the time mobile unit 143 (FIG. 3) mounted with terminal apparatus 101 enters region 146 (FIG. 3) (or before the unit 143 enters region 146).

Content list 153 acquired in step S301 by prefetch scheduler 104 is stored in storage section 113. Storage managing section 112 and display control section 109 access stored content list 153.

Next, position detecting section 110 detects a position of mobile unit 143 (step S302).

Prefetch scheduler 104 determines a passage expected road based on the position of mobile unit 143 detected in step S302 (step S303).

The passage expected road is a road predicted for mobile unit 143 to be going to pass. Prefetch scheduler 104 determines the passage expected road by referring to a road map. Prefetch scheduler 104 may acquire a road map from wide-area road information server 102 together with content list 153, or may read road map data stored in a storage medium to acquire.

In addition, when path 144 (FIG. 3) of mobile unit 143 is already planned, prefetch scheduler 104 may determine path 144 as a passage expected road.

Prefetch scheduler 104 determines a content data acquisition region (step S304).

The content data acquisition region is determined based on the position of mobile unit 143 detected in position detecting section 110 in step S302. Further, prefetch scheduler 104 may determine the content data acquisition region in consideration of the passage expected road determined in step S303.

In addition, examples of the content data acquisition region will be described later with reference to FIGS. 12 to 15.

Next, prefetch scheduler 104 notes an item of content data 152 (one record) among content list 153 (step S305).

Prefetch scheduler 104 determines whether the position (content position) to which is related the content data 152 noted in step S305 is included in the content data acquisition region (step S306).

When a result of the determination in step S306 is "Yes", prefetch scheduler 104 proceeds to processing of S307. Meanwhile, when a result of the determination in step S306 is "No", prefetch scheduler 104 proceeds to processing of step S308.

In step 307, prefetch scheduler 104 designates the noted content data 152 as a candidate for content data to acquire.

In step S308, prefetch scheduler 104 determines whether or not the processing of steps S305 to S307 is finished on all the content data of content list 153.

When a result of the determination in step S308 is "Yes", prefetch scheduler 104 proceeds to processing of step S309. Meanwhile, when a result of the determination in step S308 is "No", prefetch scheduler 104 returns to the processing of step S305.

In this way, prefetch scheduler 104 executes the processing of steps S305 to S307 on each record (content data) included in content list 153, and thus, specifies a candidate for content data to acquire from items of content data included in content list 153.

Prefetch scheduler 104 determines non-stored content data among candidates for content data to acquire (step S309).

Non-stored content data is content data that is not stored in storage section 113. Prefetch scheduler 104 determines non-stored content data by inquiring whether or not the content data is stored in storage section 113 at storage managing section 112.

Next, terminal apparatus 101 acquires the non-stored content data from content server 103 (step S310).

Specifically, in step S310, prefetch scheduler 104 functions as an address readout section that reads out an address associated with a content position of a candidate for content data to acquire from content list 153 to provide to prefetch section 105.

In addition, prefetch scheduler 104 does not read out an address associated with a content position of already acquired content data (that is not non-stored content data) among the candidates for content data to acquire, every processing in step S310.

Prefetch section 105 transmits request 151 (FIG. 6) to request content data (non-stored content data) corresponding to the address read out in prefetch scheduler 104 to content server 103.

In response to request 151, content server 103 transmits the non-stored content data (content data 152) to terminal apparatus 101.

Thus, in step S310, prefetch section 105 functions as a content data acquiring section that acquires a candidate for content data to acquire.

In addition, prefetch section 105 does not acquire already acquired content data (that is not non-stored content data) among the candidates for content data to acquire, every processing in step S310.

Further, prefetch scheduler 104 may consider time required to acquire non-stored content data (content data 152) when prefetch section 105 acquires the non-stored content data from content server 103 in step S310. Specifically, prefetch section 105 starts acquisition as late as possible, as long as the non-stored content data is acquired until the display scheduled time. This is because the risk is reduced as much as possible of excessively acquiring content data 152 that is not displayed eventually, for example, for the reason that mobile unit 143 abruptly changes the moving direction.

Prefetch scheduler 104 determines the display scheduled time, for example, as the time three minutes before the time expected as the display limit time of content data 152.

When mobile unit 143 passes through the content position of content data 152, the "display limit time" of content data 152 is defined as the time of the passage. When mobile unit 143 does not pass through the content position of content data 152, the "display limit time" of content data 152 is defined as the time at which mobile unit 143 comes the closest to the content position of content data 152.

Further, when mobile unit 143 does not pass through the content position of content data 152, the "display limit time" may be defined as the time at which mobile unit 143 passes through a branching location on path 144 through which mobile unit 143 should pass to arrive at the content position of content data 152.

Prefetch scheduler 104 obtains the time required for acquiring content data 152 by dividing the size of the content data 152 by a transmission rate (nominal transmission rate or actual transmission rate) of wireless communication path 141 (FIG. 6)

In addition, a plurality of wireless communication paths 141 may be provided. In this case, prefetch scheduler 104 judges which of the plurality of wireless communication paths 141 allows communications, and further may determine wireless communication path 141 to use by considering respective transmission rates, communication charges or the like of wireless communication paths allowing communications.

In order to judge whether wireless communication path 141 allows communications, prefetch scheduler 104 may detect the strength of radio signal used on wireless communication path 141, or compare a map indicative of an available area (for example, service area of a cellular telephone) of wireless communication path 141 with the current position of terminal apparatus 101. Prefetch scheduler 104 downloads such a map, for example, from wide-area road information server 106 (FIG. 6).

Thus, terminal apparatus 101 acquires content data 152 included in the content data acquisition region.

Figure 12:
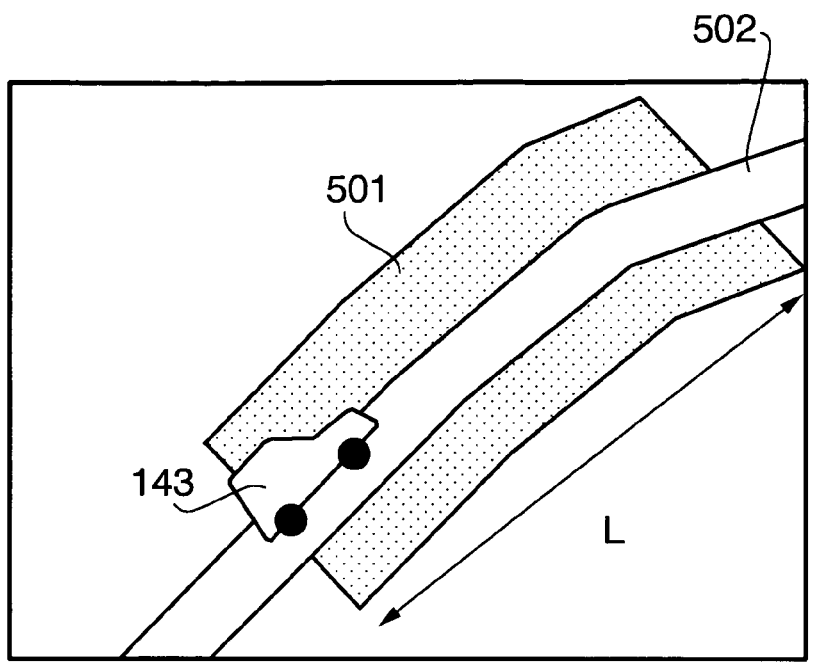
FIG. 12 is a view showing an example of a content data acquisition region according to the above embodiment.

Content data acquisition region 501 determined in step S304 as shown in FIG. 11 will be described next with reference to FIG. 12. FIG. 12 is a view showing an example of content data acquisition region 501 according to the above embodiment.

In FIG. 12, reference numeral "502" indicates a passage expected road determined in step S303 (FIG. 11).

In the example as shown in FIG. 12, content data acquisition region 501 is determined as a region, along passage expected road 502, with a predetermined length L forward of mobile unit 143. The length L maybe measured along passage expected road 502, or may be the direct distance between opposite ends of content data acquisition region 501.

In addition, terminal apparatus 101 is capable of recognizing which direction is forward of mobile unit 143 among directions along passage expected road 502 by the moving direction of mobile unit 143 detected in position detecting section 110.

Further, when the information that passage expected road 502 is a one-way road is obtained from the road map, terminal apparatus 101 is capable of recognizing which direction is forward of mobile unit 143 from the one-way information.

Content data acquisition region 501 as shown in FIG. 12 is preferably adopted in the case where passage expected road 502 has few branching points such as an intersection and exit like an expressway or freeway.

Figure 13:
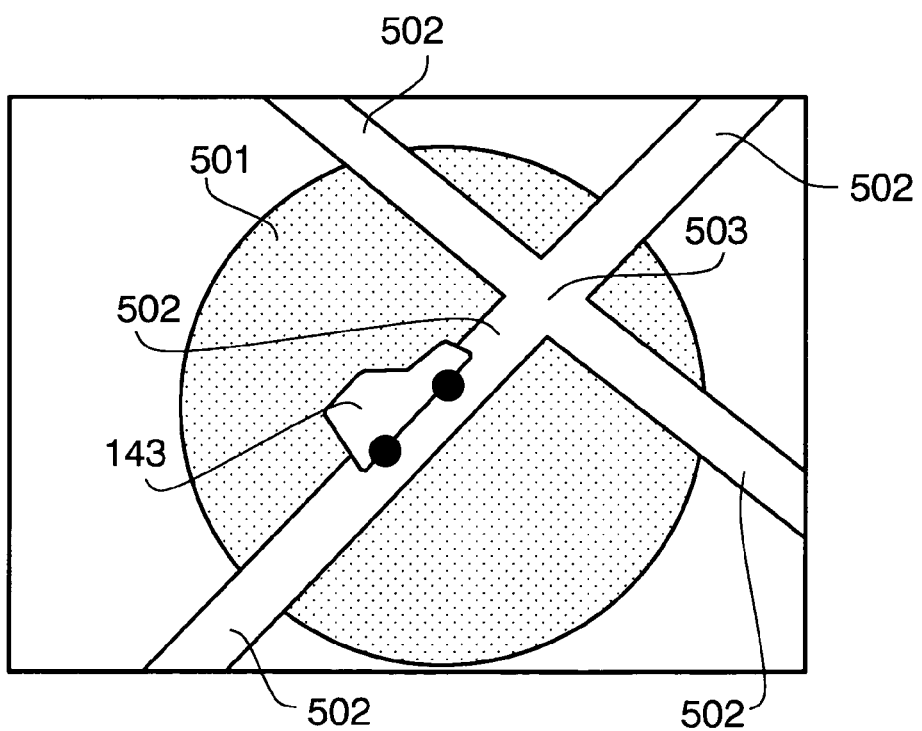
FIG. 13 is a view showing another example of the content data acquisition region according to the above embodiment.

In addition, content data acquisition region 501 is not limited to that as shown in FIG. 12. Another example of content data acquisition region 501 will be described next with reference to FIG. 13. FIG. 13 is a view showing another example of content data acquisition region 501.

In the example as shown in FIG. 13, content data acquisition region 501 is determined as a circular region with mobile unit 143 as its center.

Content data acquisition region 501 as shown in FIG. 13 is preferably adopted in the case where there are a lot of branching locations (intersections) like a general road. This is because it is not possible to predict in a general road a direction in which mobile unit 143 moves at branching location 503 (intersection) except the case where path 144 (see FIG. 3) of mobile unit 143 is beforehand planed, and it is necessary to determine all the roads branding at branching location 503 as passage expected roads.

Further, in content data acquisition region 501 as shown in FIG. 13, a backward area of mobile unit 143 is also determined as a passage expected road, in consideration of a possibility of a U-turn of mobile unit 143.

The radius of content data acquisition region 501 may be varied corresponding to the moving speed of mobile unit 143. In this case, content data acquisition region 501 is determined based on the moving speed of mobile unit 143 and the position of mobile unit 143.

As shown in FIGS. 12 and 13, it is possible to acquire content data 152 efficiently by defining a shape of content data acquisition region 501 corresponding to conditions of roads in the moving direction of mobile unit 143.

Figure 14:
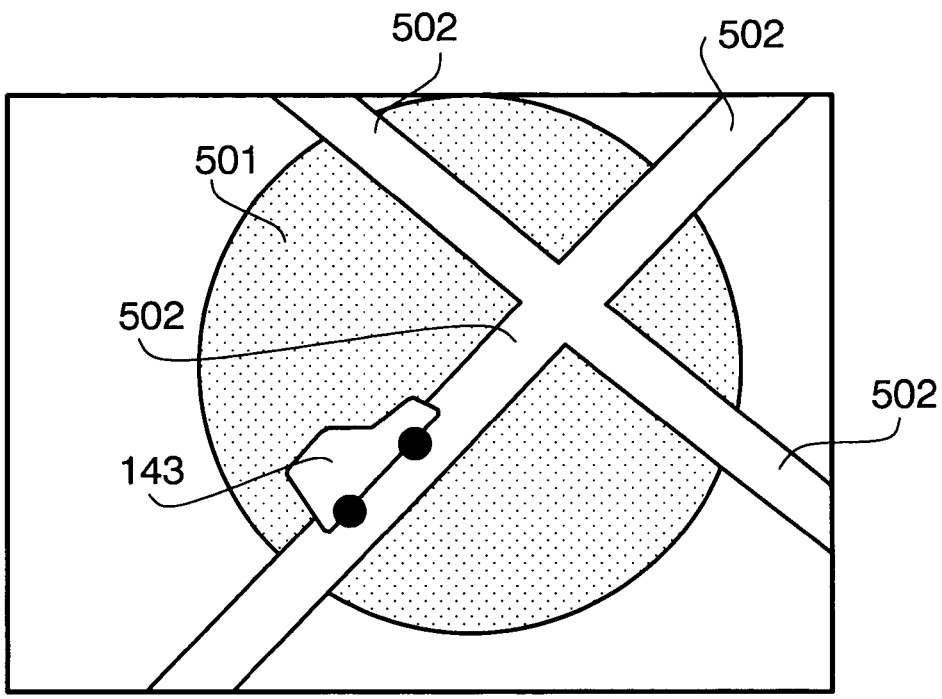
FIG. 14 is a view showing still another example of the content data acquisition region according to the above embodiment.
Figure 15:
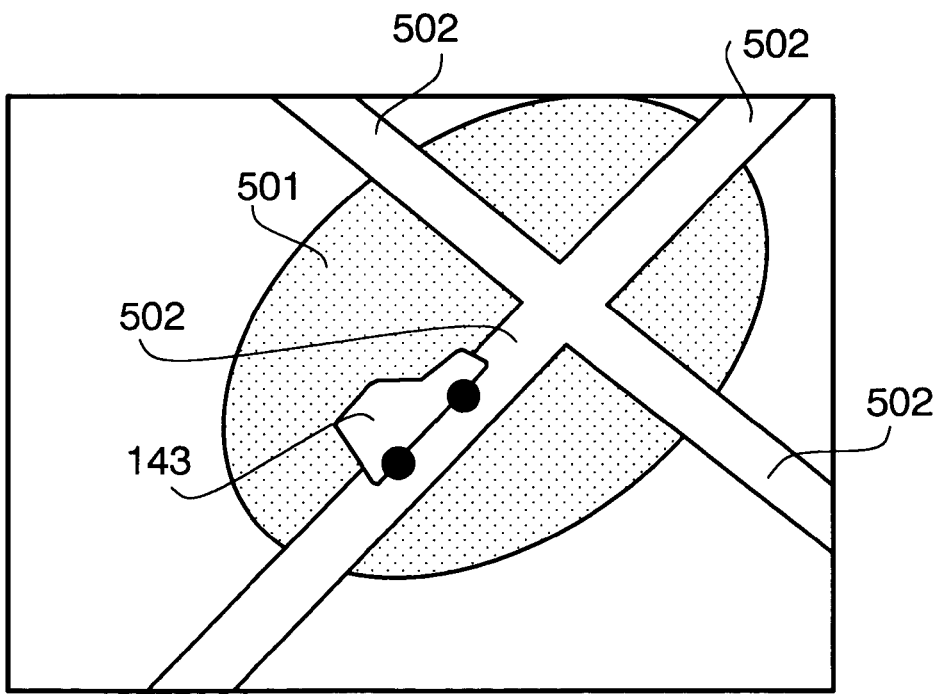
FIG. 15 is a view showing still another example of the content data acquisition region according to the above embodiment.

Other examples of the content data acquisition region will be described below with reference to FIGS. 14 and 15. FIGS. 14 and 15 further show other examples of content data acquisition region 501.

Content data acquisition region 501 as shown in FIG. 14 is determined as a circular region with the center positioned forward of mobile unit 143.

Content data acquisition region 501 as shown in FIG. 15 is determined as an ellipse-shaped region extending in the traveling direction of mobile unit 143. In other words, content data acquisition region 501 is determined based on the traveling direction of mobile unit 143 and the moving speed of mobile unit 143.

By determining content data acquisition regions 501 in consideration of the traveling direction (moving direction) of mobile unit 143 as shown in FIGS. 14 and 15, it is possible to efficiently acquire content data having the content position in a position forward of mobile unit 143.

As shown in FIGS. 12 to 15, content data acquisition region 501 (first region) is defined to include at least an area forward of mobile unit 143, based on the position of mobile unit 143 detected in position detecting section 110 (FIG. 6).

The forward of mobile unit 143 is the moving direction in which mobile unit 143 moves, but the information of moving direction is not always necessary in defining content data acquisition region 501. As shown in FIG. 13, even when there is no information of the moving direction of mobile unit 143, content data acquisition region 501 is defined to include an area forward of mobile unit 143.

Thus, prefetch scheduler 104 (FIG. 6) functions as a specifying section that specifies a content position associated with a position which mobile unit 143 approaches as a content position for the candidates of content data to acquire, among at least one content position defined in content list 153. Herein, mobile unit 143 approaching some position means that the distance between the position and mobile unit 143 is decreased with time.

Further, as described above, the size of content data acquisition region 501 may be always constant or varied with the speed of mobile unit 143.

Furthermore, it is not indispensable that position detecting section 110 (FIG. 6) detects a moving direction and moving speed of the mobile unit.

When the moving speed of mobile unit 143 is known and the moving direction of mobile unit 143 is unknown, for example, content data acquisition region 501 is defined as a circle of a size corresponding to the moving speed with the position of mobile unit 143 as its center. Further, when the moving speed of mobile unit 143 is unknown and the moving direction of mobile unit 143 is known, for example, content data acquisition region 501 is defined as an ellipse of a constant size with a major axis along the moving direction. When the moving speed and moving direction of mobile unit 143 are both unknown, for example, content data acquisition region 501 is defined as a circle of a constant size with the position of mobile unit 143 as its center.

Figure 16:
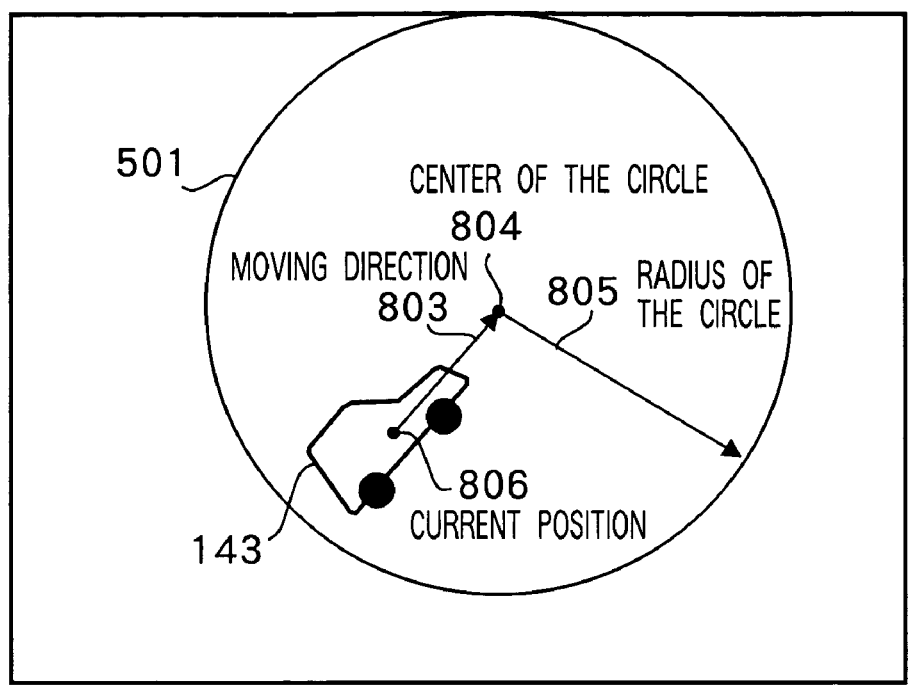
FIG. 16 is a view showing an example of a scheme of determining a size and a shape of the content data acquisition region according to the above embodiment.

A scheme of determining content data acquisition region 501 will be described below with reference to FIG. 16. FIG. 16 is a view showing an example of the scheme of determining a size and a shape of content data acquisition region 501.

In the example as shown in FIG. 16, content data acquisition region 501 is determined as a circular region with the center forward of mobile unit 143.

The distance between current position 806 of mobile unit 143 and center 804 of the circle is set based on the moving speed of mobile unit 143. For example, the distance between current position 806 of mobile unit 143 and center 804 of the circle is set at a large value when the moving speed of mobile unit 143 is high, while being set at a small value when the moving speed of mobile unit 143 is low.

In this case, position detecting section 110 needs to detect moving direction 803 and the moving speed of mobile unit 143 in addition to current position 806 of mobile unit 143.

In addition, the distance between current position 806 of mobile unit 143 and center 804 of the circle may be set at a constant value (for example, zero) irrespective of the moving speed of mobile unit 143.

Radius 805 of the circle is set based on the moving speed of mobile unit 143. For example, radius 805 is set at a large value when the moving speed of mobile unit 143 is high, while being set at a small value when the moving speed of mobile unit 143 is low.

Further, radius 805 may be set so that the number of items of content data (candidates for content data to acquire) whose content positions are included in content data acquisition region 501 is less than a predetermined limitation number.

Furthermore, radius 805 maybe set so that the total size of candidates for content data to acquire is less than a predetermined limitation value. For example, the size of a candidate for content data to acquire can be recognized by referring to "size" field 203 of content list 153 as shown in FIG. 8, or by inquiring at content server 103.

When content data acquisition region 501 is determined as shown in FIG. 16, content data whose content position meets the relationship of "(distance between center 804 of the circle and the content position)<(radius 805 of the circle)" is designated as a candidate for content data to acquire in step S307 (FIG. 11).

Figure 17:
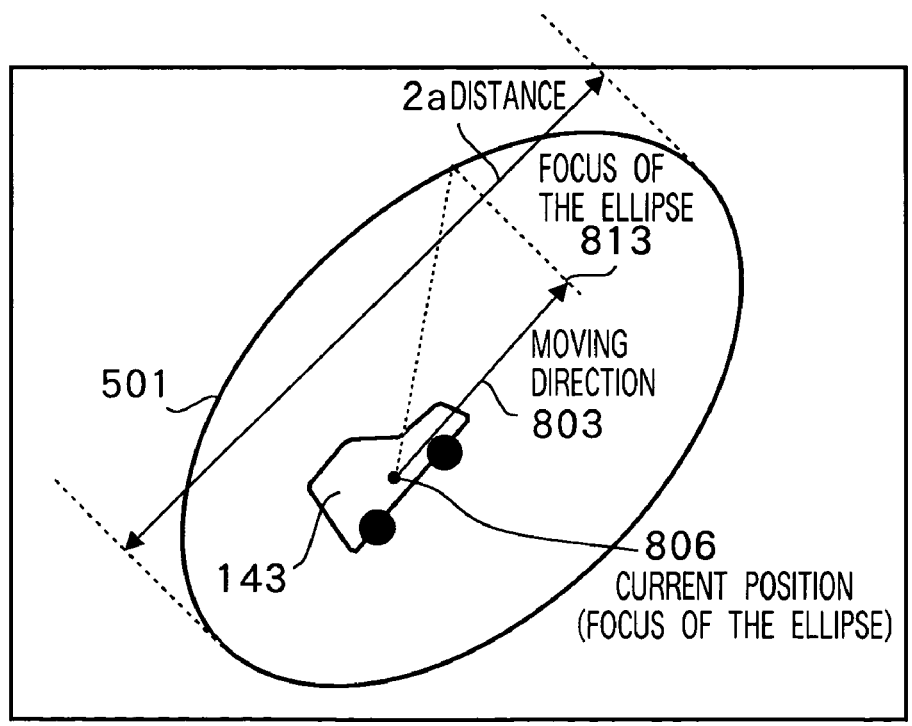
FIG. 17 is a view showing another example of the scheme of determining a size and a shape of the content data acquisition region according to the above embodiment.

Another scheme of determining content data acquisition region 501 will be described below with reference to FIG. 17. FIG. 17 is a view showing an example of the scheme of determining a size and a shape of content data acquisition region 501.

In the example as shown in FIG. 17, content data acquisition region 501 is determined as an ellipse-shaped region.

Content data acquisition region 501 has current position 806 of mobile unit 143 as one focus and point 803 forward of mobile unit 143 as the other focus.

The distance between current position (focus) 806 of mobile unit 143 and focus 813 is set based on the moving speed of mobile unit 143. For example, the distance between focuses 806 and 813 is set at a large value when the moving speed of mobile unit 143 is high, while being set at a small value when the moving speed of mobile unit 143 is low.

In this case, position detecting section 110 needs to detect moving direction 803 and the moving speed of mobile unit 143 in addition to current position 806 of mobile unit 143.

The distance between focuses 806 and 813 may be set at a constant value, irrespective of the moving speed of mobile unit 143.

Semimajor axis "a" of the ellipse is set based on the moving speed of mobile unit 143. For example, major axis "a" is set at a large value when the moving speed of mobile unit 143 is high, while being set at a small value when the moving speed of mobile unit 143 is low.

Further, major axis "a" maybe set so that the number of items of content data (candidates for content data to acquire) whose content positions are included in content data acquisition region 501 is less than a predetermined limitation number.

Furthermore, major axis "a" may be set so that the total size of candidates for content data to acquire is less than a predetermined limitation value. When content data acquisition region 501 is determined as shown in FIG. 17, content data whose content position meets the relationship of "(distance between focus 806 and the content position)+(distance between focus 813 and the content position) <2a" is designated as a candidate for content data to acquire in step S307 (FIG. 11).

Thus, content data acquisition region 501 is set for an appropriate size based on the position and moving speed of the mobile unit.

Figure 18:
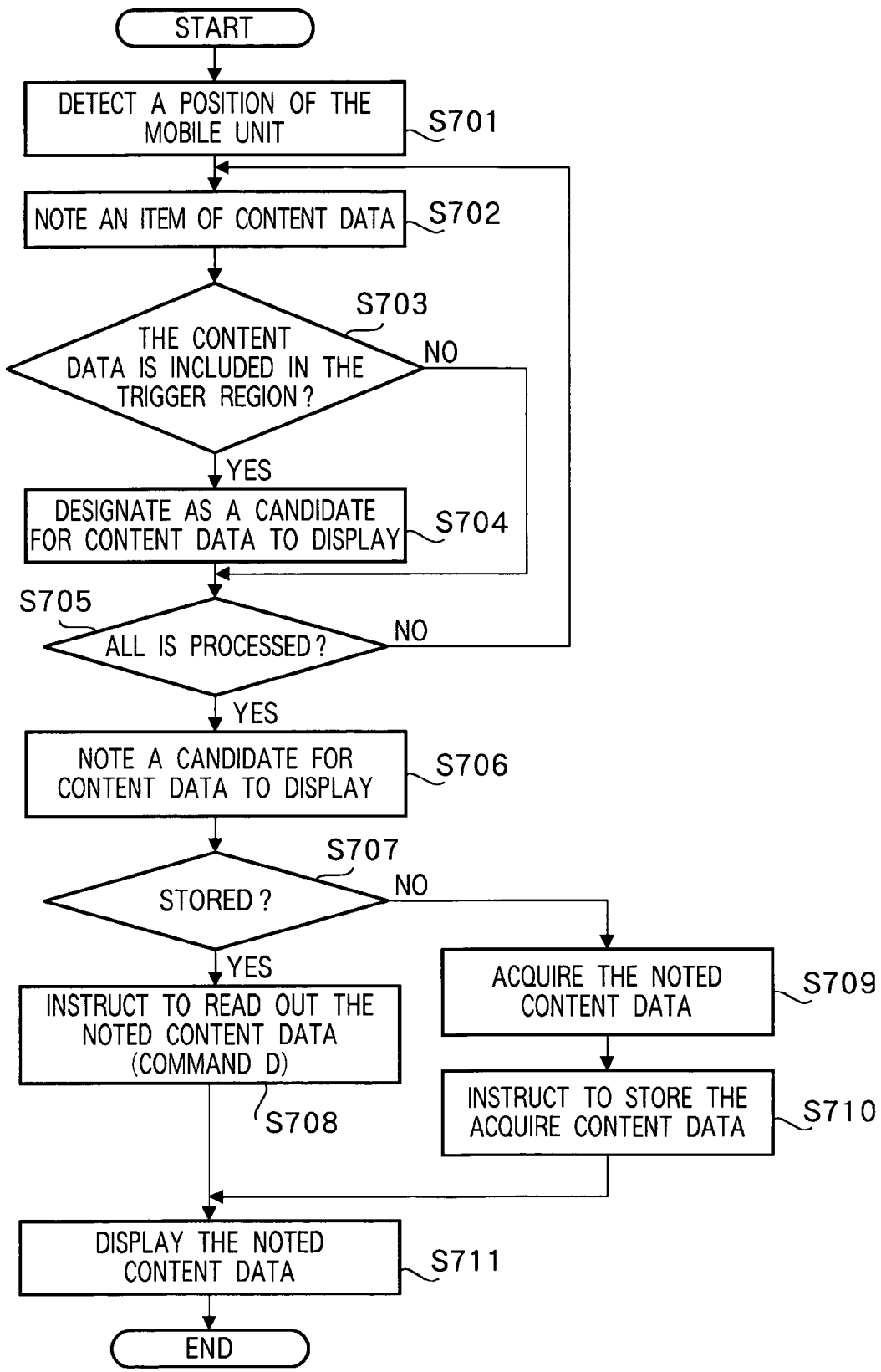
FIG. 18 is a flowchart of timing control for the terminal apparatus to display content data according to the above embodiment.

Referring to FIG. 18, the processing will be described below that terminal apparatus 101 displays content data 152. FIG. 18 is flowchart of timing control for terminal apparatus 101 to display content data 152.

The processing as illustrated in FIG. 18 is repeated at predetermined time intervals during a period of time mobile unit 143 is moving. Further, the processing as illustrated in FIG. 18 may be repeated whenever mobile unit 143 moves a predetermined distance.

Position detecting section 110 detects a position of mobile unit 143 (step S701). In step S701, position detecting section 110 further detects the moving speed and moving direction of mobile unit 143.

Display control section 109 notes an item of content data 152 (record) in content list 153 (step S702) Content list 153 is already acquired in step S301 (FIG. 11) Display control section 109 determines whether or not the position (content position) to which is related the content data 152 noted in step S702 is included in a content data display trigger region (second region) (step S703).

The content data display trigger region is determined based on the position of mobile unit 143 detected in step S701. The content data display trigger region is determined as a region of positions to which mobile unit 143 is expected to move, for example, in three minutes (predetermined time).

Display control section 109 determines whether or not it is predicted that mobile unit 143 reaches the content position in three minutes (predetermined time) after moving from the position detected in step S701, and thereby determines whether or not the content position is included in the content data display trigger region.

When a result of the determination in step S703 is "Yes", display control section 109 proceeds to processing of S704. Meanwhile, when a result of the determination in step S703 is "No", display control section 109 proceeds to processing of step S705.

In step S704, display control section 109 designates the noted content data 152 as a candidate for content data to display.

In step S705, display control section 109 determines whether or not the processing of steps S702 to S704 is completed on all the content data of content list 153.

When a result of the determination in step S705 is "Yes", display control section 109 proceeds to processing of step S706. Meanwhile, when a result of the determination in step S705 is "No", display control section 109 returns to the processing of step S702.

In step S706, display control section 109 notes one of candidates for content data to display.

Display control section 109 determines whether or not the noted content data 152 is stored in storage section 113 (step S707). Display control section 109 makes such a determination by inquiring at storage managing section 112.

When a result of the determination in step S707 is "Yes", display control section 109 proceeds to processing of step S708. Meanwhile, when a result of the determination in step S707 is "No", display control section 109 proceeds to processing of step S709.

In step S708, display control section 109 instructs storage managing section 112 to readout the noted content data 152 from storage section 113.

In response to the instruction, storage managing section 112 reads out the noted content data 152 from storage section 113.

In step S709, terminal apparatus 101 acquires the noted content data 152 from content server 103 in prefetch section. Prefetch section 105 transmits request 151 (FIG. 6) to content server 103 and thereby acquirers the content data 152.

Next, display control section 109 instructs storage managing section 112 to store the content data 152 acquired in step S709 (step S710).

In response to the instruction, storage managing section 112 stores the content data 152 acquired in step S709 in storage section 113.

Terminal apparatus 101 displays the noted content data 152 on display device 114 (step S711).

Thus, when such a condition (predetermined condition) is met that the content position of content data 152 is present inside content data display trigger region 504 (second region), display control section 109 and display device 114 function as a display section 149 that displays content data 152.

Content data 152 displayed on display device 114 (FIG. 6) will be described with reference to FIG. 19.

In region 1107, content data acquisition region 501 and content data display trigger region 504 are superimposed and displayed on a road map around mobile unit 143.

Content data 152 is displayed in region 1108. In the example as shown in FIG. 19, content data 152 is advertising information of a restaurant.

Figure 19:
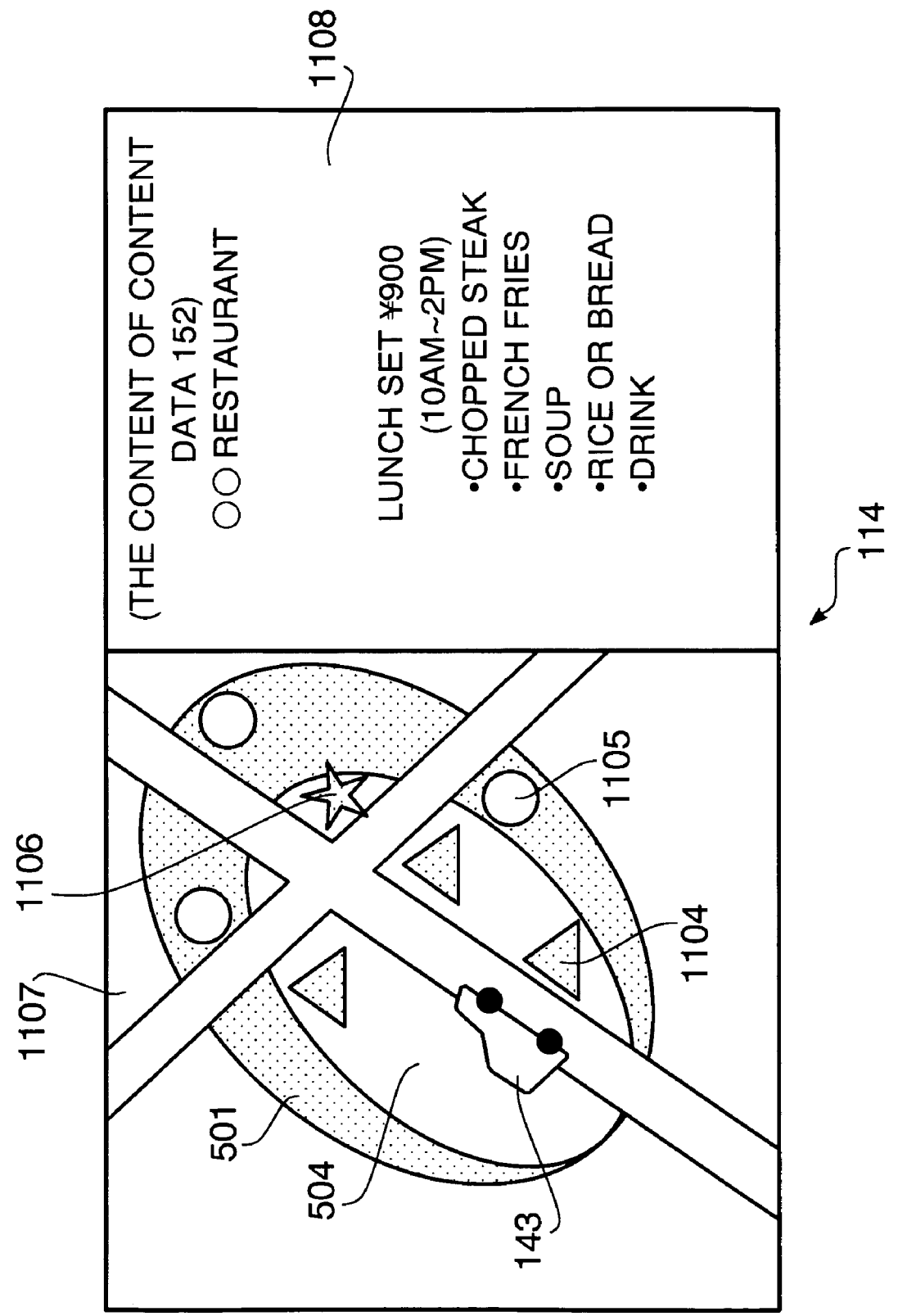
FIG. 19 is a view showing content data displayed on a display device according to the above embodiment.

In FIG. 19, triangles with hatchings shown in region 1107 indicate content positions 1104 of content included in content data display trigger region 504. White circles indicate content positions 1105 that are included in content data acquisition region 501 but are not included in content data display trigger region 504. A star with hatchings indicates content position 1106 of content data 152 currently displayed in region 1108.

Each of the triangles with hatchings, while circles and star with hatchings is an indicator indicating a position specified in prefetch scheduler 104 (FIG. 6) as the content position of a candidate for content data to acquire in steps S305 to S309 (FIG. 11).

Region 1108 is set to automatically display content data whose content positions are included in content data display trigger region 504 sequentially, or may display the content data related to content position 1104 in response to a user designating the content position 1104 displayed in region 1107.

A summary of content expressed by the content data and/or name of a facility related to the content may be displayed on the map (or outside the map) displayed in region 1107, which is achieved by adding such a summary and name of the facility to content list 153.

Content data acquisition region 501 and content data display trigger region 504 both move as mobile unit 143 moves.

As shown in FIG. 19, content data display trigger region 504 at some point is determined so that the entire region 504 is included in content data acquisition region 501 at the some point.

As described above with reference to FIG. 11, prefetch scheduler 104 controls the timing for acquiring content data 152 based on whether the content position is included in content data acquisition region 501. Further, as described above with reference to FIG. 18, display control section 109 controls the timing for displaying content data 152 based on whether the content position is included in content data display trigger region 504.

Accordingly, display control section 109 controls the timing for displaying content data 152 so as to display the content data 152 when mobile unit 143 is relatively close to the content position of the noted content data 152. Meanwhile, prefetch scheduler 104 controls the timing for acquiring content data 152 so as to acquire (prefetch) the content data 152 before the data 152 is displayed on display section 114.

Only when such "prefetch" is not carried out due to any reason (exception case), a result of the determination in step S707 (FIG. 19) is "No". Such a result is "Yes" in other cases.

Figure 20:
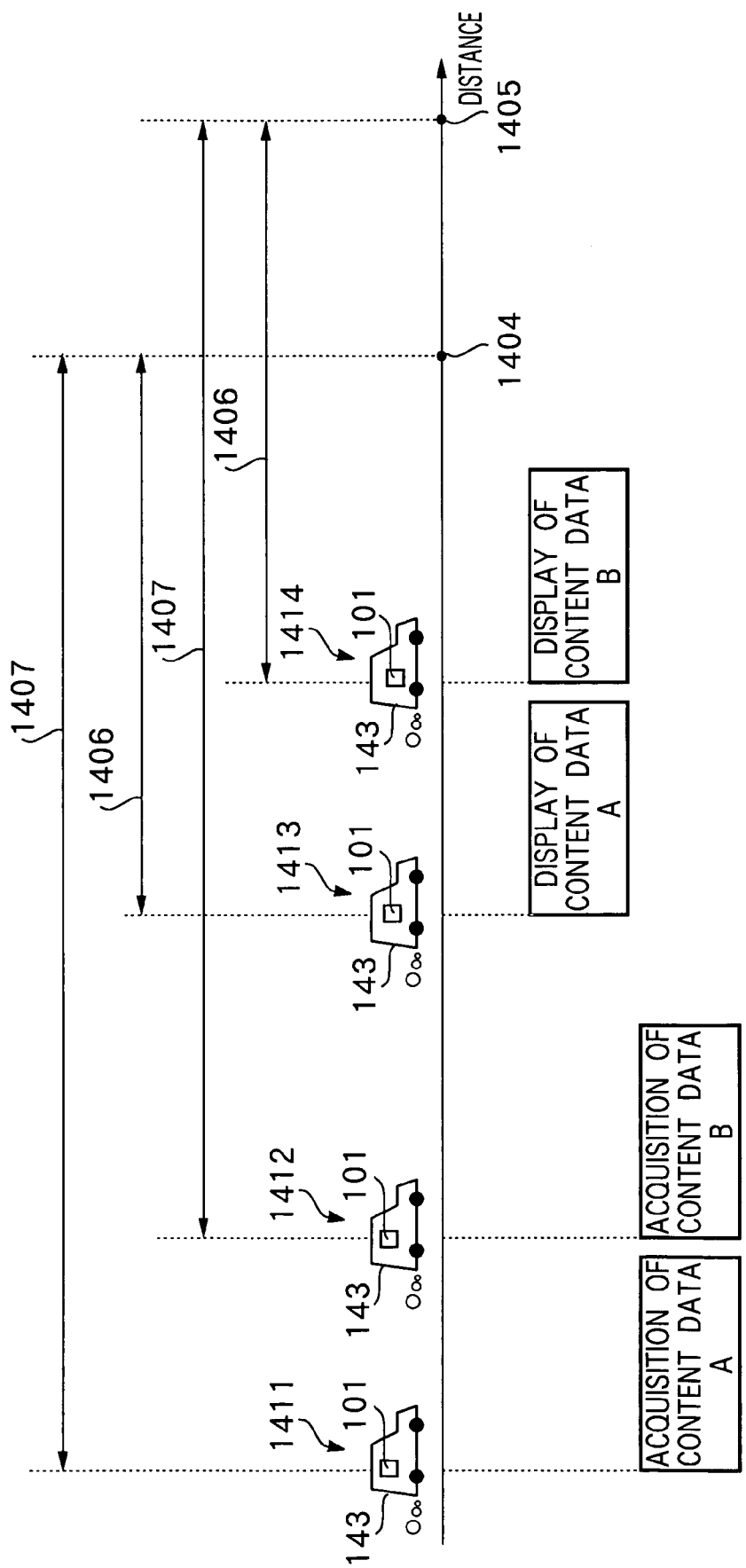
FIG. 20 is a view showing the terminal apparatus acquiring content data to enable display of the data as the mobile unit moves according to the above embodiment.

With reference to FIG. 20, a situation will be described below where terminal apparatus 101 acquires content data and enables display of the data as mobile unit 143 moves. FIG. 20 is a view showing terminal apparatus 101 acquiring content data to enable display of the data as mobile unit 143 moves.

In FIG. 20, the horizontal axis indicates a moving distance of mobile unit 143. It is assumed that mobile unit 143 moves from the left side to the right side as viewed in FIG. 20.

It is further assumed that content data A expresses content A related to location 1404, and that content data B expresses content B related to location 1405. In other words, locations 1404 and 1405 are respective content positions of content data A and content data B.

Distance 1407 indicates the distance from the position of mobile unit 143 to the front end of the content data acquisition region along the moving direction (i.e. distance L in the example as shown in FIG. 12).

Distance 1406 indicates the distance from the position of mobile unit 143 to the front end of the content data display trigger region along the moving direction.

Control of the timing for prefetch scheduler 104 to acquire content data will be described below with reference to FIG. 20.

At the time mobile unit 143 exists in location 1411, content data A enters the content data acquisition region. At this point, content data A is acquired (prefetch).

Similarly, at the time mobile unit 143 exists in location 1412, content data B enters the content data acquisition region. At this point, content data B is acquired (prefetch).

Control of the timing for display control section 109 to display content data will be below described with reference to FIG. 20.

At the time mobile unit 143 exists in location 1413, content data display trigger region 504 starts including the content position of content data A. At this point, content data A is automatically displayed on display device 114 (FIG. 6).

Similarly, at the time mobile unit 143 exists in location 1414, content data display trigger region 504 starts including the content position of content data B. At this point, content data B is automatically displayed on display device 114 (FIG. 6).

In this way, it is possible to display content data A and content data B both before passing through respective content positions.

Further, the content data may be displayed in response to a request from a user (for example, a driver and/or passenger of mobile unit 143) before being automatically displayed (in other words, before the content position of the content data is included in the content data display trigger region). Such a request is, for example, carried out by a user touching an indicator indicative of a content position shown by a white circle in region 1107 (FIG. 19) on display device 114. In this case, it is a premise that the content data has been acquired and is allowed to be displayed.

On the assumption that the time required to acquire content data is constant irrespective of the moving speed of mobile unit 143, when the moving speed of mobile unit 143 is increased, the distance is increased that mobile unit 143 moves during the time required to acquire the content data. Accordingly, when the moving speed of mobile unit 143 is increased, it is preferable to increase distance 1407 to display the content data before passing through its content position. In other words, when the moving speed of mobile unit 143 is increased, it is preferable to increase content data acquisition region 501.

Figure 21:
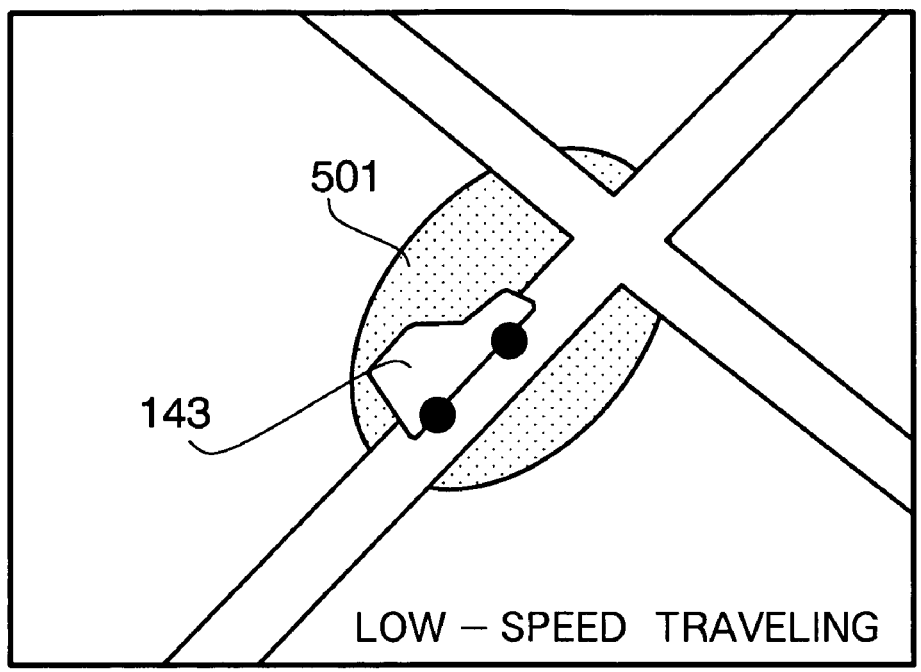
FIG. 21 is a view showing an example of a size of the content data acquisition region when the mobile unit moves at low speed according to the above embodiment.

FIG. 21 is a view showing an example of the size of content data acquisition region 501 when mobile unit 143 moves at low speed. Further, FIG. 22 is a view showing an example of the size of content data acquisition region 501 when mobile unit 143 moves at high speed.

Figure 22:
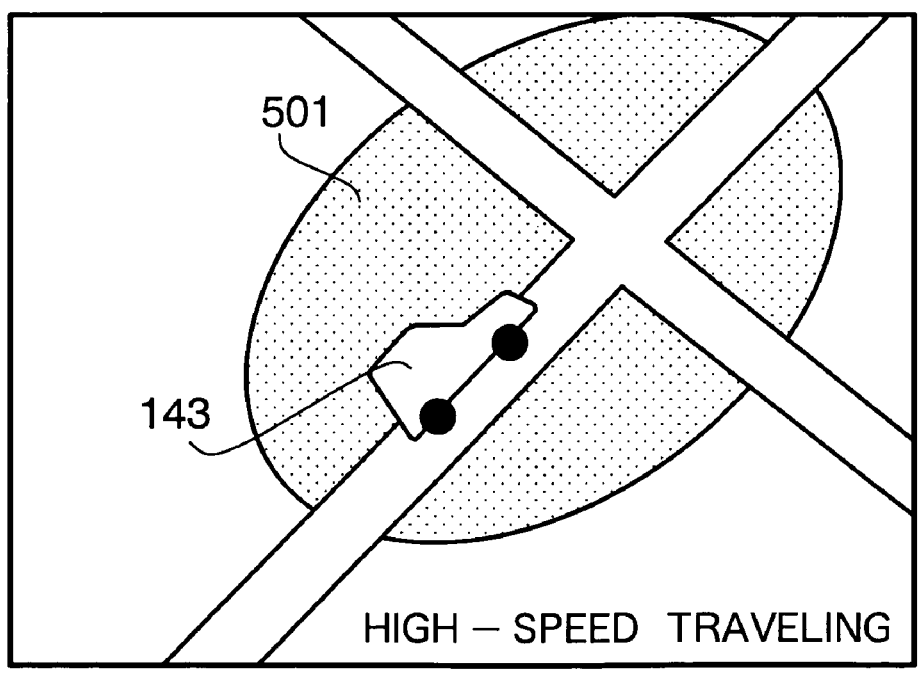
FIG. 22 is a view showing another example of the size of the content data acquisition region when the mobile unit moves at high speed according to the above embodiment.

As shown in FIGS. 21 and 22, by defining to vary the length of content data acquisition region 501 along the moving direction of mobile unit 143 corresponding to the moving speed of mobile unit 143, it is possible to display content data assuredly before passing through its content position.

In the aforementioned embodiment, whether or not to acquire content data 152 is only determined corresponding to the condition that the content position of content data 152 is included in a content data acquisition region. However, in addition to the condition, it may be possible to determine whether or not to acquire content data 152 corresponding to conditions such as the time, consecutive traveling time of mobile unit 143, weather, remaining fuel quantity of mobile unit 143, user preferences and genre of content.

For example, it may be possible to acquire content data expressing content of a restaurant (for example, Japanese restaurant) according to user preferences during meal hours without acquiring the content data during hours except the meal hours. Such acquisition is implemented by adding keyword information to content list 153 and comparing the keyword information with a database of user preferences.

For example, such comparison is performed after step S306 as shown in FIG. 11. Further, it may be possible to use such a condition in determining the order for displaying acquired content data.

Moreover, it may be possible to acquire content data expressing content of a rest place such as a service area and gas station when the consecutive travel time becomes long, or to acquire content data expressing content of indoor rest and/or entertainment facilities when it rains. Further, it may be possible to acquire only content data expressing content of currently operated facilities.

Terminal apparatus 101 makes a determination on whether content data 152 meets a condition such as the time, consecutive traveling time of mobile unit 143, weather, remaining fuel quantity of mobile unit 143, user preferences and genre of content. Accordingly, a load for the search is not imposed on content server 103, and the response of content server 103 is improved. Further, the risk is eliminated that user preferences leak outside.

As described above, according to the above-mentioned embodiment, content server 103 (that is a server from which content data is acquired) does not need to perform content search based on a position of mobile unit 143. Accordingly, it is possible to reduce loads on content server 103.

Further, according to the above-mentioned embodiment, terminal apparatus 101 acquires content data having a position associated with the content data acquisition region including an area forward of mobile unit 143 in the moving direction. It is thereby possible for terminal apparatus 101 to acquire content data before arriving at the position in relation to the content data. Accordingly, a user of terminal apparatus 101 is capable of checking the content data displayed before passing through the position in relation to the content data.

Furthermore, according to the above-mentioned embodiment, the timing for displaying content data can be controlled based on whether the content position is included in the content data display trigger region. By this means, when mobile unit 143 moves, thereby exists away from the position in relation to the content data that is beforehand prefetch and acquired, and does not need the acquired content data, it is possible not to display the content data.

Since the content data display trigger region is smaller than the content data acquisition region, it is possible to display content data after mobile unit 143 comes relatively close to the content position of the noted content data. Accordingly, it is possible to effectively prevent the content data that has been acquired but becomes unnecessary from being displayed unnecessarily. Thus, the present invention supports the case where prefetch content data becomes unnecessary due to movement of mobile unit 143.

According to the above-mentioned embodiment, it is possible to present content data at the time the content data display trigger region starts including the position of the acquired content data. It is thus possible to present the content of the position through which mobile unit 143 is expected to pass before mobile unit 143 passes through such a position, without considering the time required for acquisition.

Further, according to the above-mentioned embodiment, it is possible to define to vary the length of content data acquisition region along the moving direction of mobile unit 143 corresponding to the moving speed of mobile unit 143. It is thereby possible to acquire content data assuredly before passing through its content position and display the data, even when the speed of a mobile unit is high.

In addition, a mode may be provided with a dedicated server that searches for content in response to a position of the terminal apparatus and performs prefetch processing.

Figure 23:
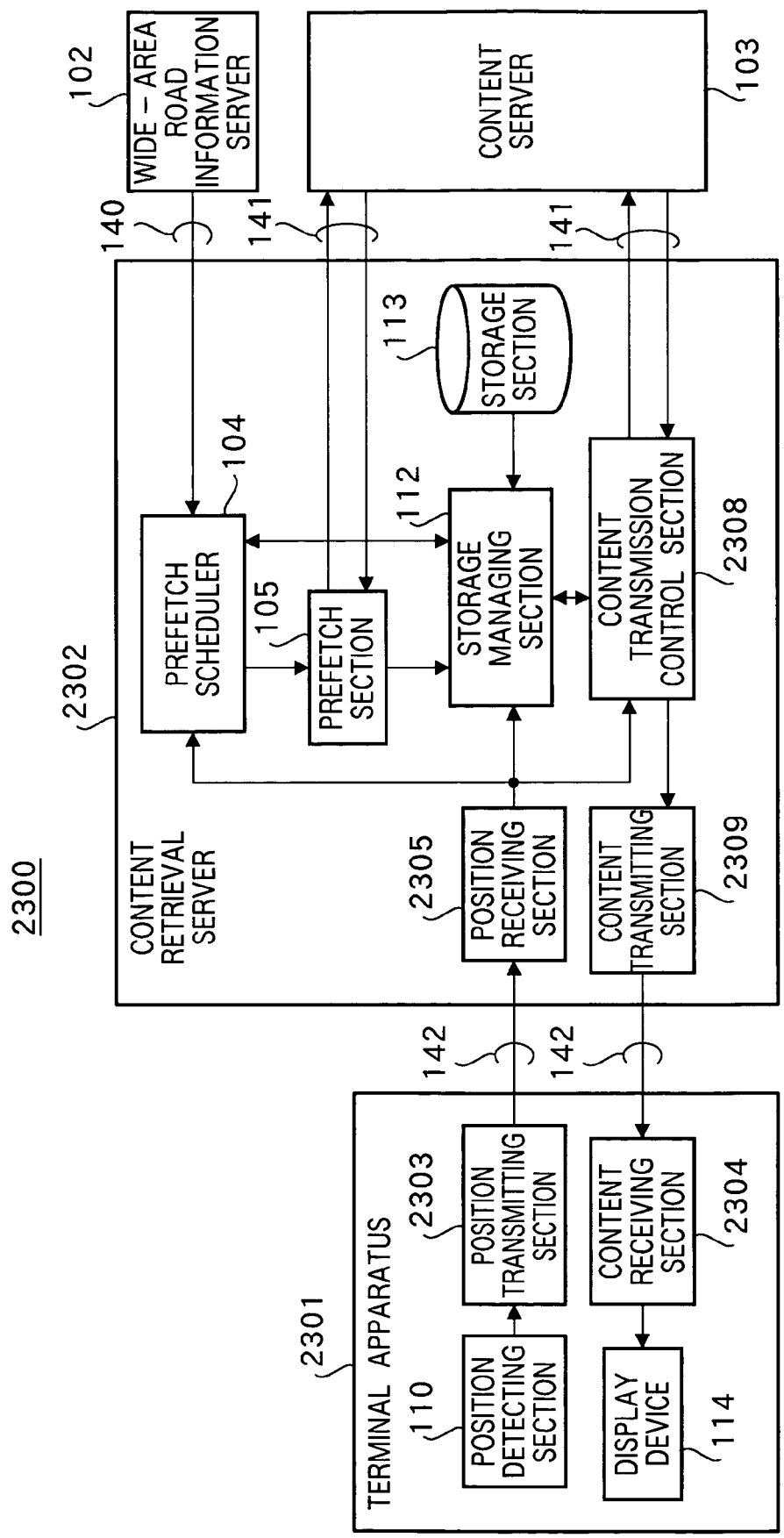
FIG. 23 is a block diagram illustrating another configuration of the content distribution system according to the above embodiment.

Another content distribution system according to the embodiment of the present invention will be described below with reference to FIG. 23. FIG. 23 is a block diagram illustrating another structure of the content distribution system.

Content distribution system 2300 as another example is provided with terminal apparatus 2301, content retrieval server 2302, wide-area road information server 102 and content server 103.

Terminal apparatus 2301 is connected to content retrieval server 2302 via wireless communication path 142. Content retrieval server 2302 is connected to wide-area road information server 102 by wireless communication path 140. Content retrieval server 2302 is further connected to content server 103 by wireless communication path 141.

Terminal apparatus 2301 is provided with position detecting section 110. Position detecting section 110 is the same as illustrated in FIG. 6, and specific descriptions thereof are omitted. Position detecting section 110 detects a position, moving direction, moving speed or the like of terminal apparatus 2301, and outputs the detected information to position transmitting section 2303.

Position transmitting section 2303 transmits the position, moving direction, moving speed or the like detected in position detecting section 110 to content retrieval server 2302 via wireless communication path 142.

Terminal apparatus 2301 is further provided with content receiving section 2304 that receives content transmitted from content retrieval server 2302 via wireless communication path 142. Content receiving section 2304 outputs the received content to display device 114. Display device 114 displays the content.

Content retrieval server 2302 is provided with position receiving section 2305 that receives the position, moving direction, moving speed or the like transmitted from terminal apparatus 2301.

Content retrieval server 2302 is further provided with prefetch scheduler 104, prefetch section 105, storage managing section 112 and storage section 113. Prefetch scheduler 104, prefetch section 105, storage managing section 112 and storage section 113 are the same as respective sections as illustrated in FIG. 6, and specific descriptions thereof are omitted.

Content retrieval server 2302 is further provided with content transmission control section 2308. Content transmission control section 2308 corresponds to display control section 109 as illustrated in FIG. 6. While display control section 109 controls the timing for displaying content, content transmission control section 2308 controls the timing for transmitting content. The processing of content transmission control section 2308 is processing in FIG. 18 except step S711, which is replaced with "transmitting content to terminal apparatus 2301 via content transmitting section 2309".

According to this configuration, terminal apparatus 2301 is capable of receiving content in response to information in content receiving section 2304, only by transmitting the information of the position, speed, traveling direction or the like to content retrieval server 2302 from position transmitting section 2302.

In this way, it is not necessary to provide terminal apparatus 2301 with the function of searching for content corresponding to the information such as the position to prefetch. As a result, a general terminal apparatus is applicable as terminal apparatus 2301. Accordingly, the general terminal apparatus is also capable of presenting content data appropriately while moving at high speed.

In addition, in the example as shown in FIG. 23, wide-area road information server 102 is not necessary always. Content retrieval server 2302 may have the content list beforehand in storage section 113.

When content retrieval server 2302 beforehand stores all the content, prefetch scheduler 104 and prefetch section 105 are not needed.

In addition, it may be possible to prepare a program of the processing performed by terminal apparatus 101, terminal apparatus 2301 or content retrieval server 2302, and make a general computer execute the program to implement the processing of terminal apparatus 101 terminal apparatus 2301 or content retrieval server 2302.

This application is based on the Japanese Patent Application No.2001-338782 filed on Nov. 2, 2001, entire content of which is expressly incorporated by reference herein.

INDUSTRIAL APPLICABILITY

As described above, according to the present invention, a server from which content data is acquired does not need to search for content based on a position of a terminal apparatus. Accordingly, it is possible to reduce loads on the server.

The invention claimed is:

1. A terminal apparatus that is configured to be included with a mobile unit and that acquires content for presentation of information associated with a position, the terminal apparatus comprising:
   a content list storage that stores a content list including at least one pair of an address of the content and an associated position, the address uniquely specifying a storage location on a network;
   a position detector that detects a position of the mobile unit;
   a specifier which defines a content acquisition region including an area located in a traveling direction of the mobile unit based on the detected position of the mobile unit, and identifies at least one position included in the content list which is located in the content acquisition region;
   a content requester that requests content associated with the at least one identified position using the content address associated with the identified position via a wireless communication to a content server;
   a content acquirer that acquires the requested content from the content server; and
   a presenter that presents the acquired content.

2. The terminal apparatus according to claim 1, wherein the specifier defines a length of the content acquisition region based upon a moving speed of the mobile unit.

3. The terminal apparatus according to claim 1, wherein the specifier defines the content acquisition region based upon a path of a road located in the traveling direction of the mobile unit.

4. The terminal apparatus according to claim 1, further comprising:
   a content list acquirer that acquires the content list by receiving communications or broadcast signals.

5. The terminal apparatus according to claim 1, wherein the presenter presents a map and an indicator indicative of the at least one identified position.

6. The terminal apparatus according to claim 1, further comprising:
   a presentation controller that determines whether to present the acquired content with the presenter based on the position of the mobile unit.

7. The terminal apparatus according to claim 6, wherein the presentation controller determines a presentation trigger region in which the mobile unit is predicted to be located after moving for a predetermined time, and presents the acquired content when the position corresponding to the acquired content is in the presentation trigger region.

8. The terminal apparatus according to claim 7, wherein the presentation controller presents the acquired content when the presentation trigger region begins to include the position of the acquired content.

9. A content distribution system, comprising:
   the terminal apparatus according to claim 1;
   a list server that stores the content list; and
   a content server that stores the content,
   wherein the terminal apparatus acquires the content list from the list server via wireless communications, and further acquires the content from the content server via wireless communications.

10. A content distribution system, comprising:
    a terminal apparatus included with a mobile unit, comprising:

a position detector that detects a position of the mobile unit;

a position transmitter that transmits the detected position of the mobile unit; and a content receiver that receives transmitted content, and a server, comprising:

a content list storage that stores a content list including at least one pair of an address of content related to a position and the position;

a position receiver that receives the position of the mobile unit transmitted from the terminal apparatus;

a specifier which defines a content acquisition region including an area located in a traveling direction of the mobile unit based on the received position of the mobile unit, and identifies at least one position included in the content list which is located in the content acquisition region;

a content acquirer that acquires content for a presentation of information associated with the at least one identified position using the address related to the identified position; and a content transmitter that transmits the acquired content to the terminal apparatus.

11. A method of acquiring content for a presentation of information associated with a position of a terminal apparatus included with a mobile unit, comprising:

storing a content list including at least one pair of an address of the content and an associated position, the address uniquely specifying a storage location on a network;

detecting a position of the mobile unit;

defining a content acquisition region including an area located in a traveling direction of the mobile unit based on the detected position of the mobile unit;

identifying at least one position included in the content list which is located in the content acquisition region;

requesting content associated with the at least one identified position using the address of the content associated with the identified position via a wireless communication to a content server; and acquiring the requested content from the content server.

12. A computer-readable medium comprising a program for a terminal apparatus included with a mobile unit to acquire content for presentation of information associated with a position, the program comprising instructions for:

storing a content list including at least one pair of an address of the content and an associated position, the address uniquely specifying a storage location on a network;

detecting a position of the mobile unit;

defining a content acquisition region including an area located in a traveling direction of the mobile unit based on the detected position of the mobile unit;

identifying at least one position included in the content list which is located in the content acquisition region;

requesting content associated with the at least one identified position using the address of the content associated with the identified position via a wireless communication to a content server; and acquiring the requested content from the content server.

13. The terminal apparatus according to claim 1, wherein the specifier defines the size of the content acquisition region based upon a moving speed of the mobile unit.

14. The terminal apparatus according to claim 1, wherein the content acquirer determines a time period required for acquiring the requested content and acquires the requested content before the mobile unit passes the identified position.

15. The terminal apparatus according to claim 14, wherein the content acquirer determines the time period required for acquiring the requested content by dividing a size of the requested content by a transmission rate of a communication path used to acquire the requested content.

16. The terminal apparatus according to claim 1, wherein the content acquirer acquires the requested content to while the mobile unit is moving.

17. The terminal apparatus according to claim 7, wherein the presenter presents a map indicating the presentation trigger region and the region including the area included in the traveling direction of the mobile unit.

* * * * *

UNITED STATES PATENT AND TRADEMARK OFFICE
CERTIFICATE OF CORRECTION

PATENT NO.       : 7,203,597 B2
APPLICATION NO.  : 10/492545
DATED            : April 10, 2007
INVENTOR(S)      : Junichi Sato et al.

It is certified that error appears in the above-identified patent and that said Letters Patent is hereby corrected as shown below:

On page 2 at Item (56), References Cited, "English language Abstract of JP11-65343" should be --English language Abstract of JP 11-65434--; and On page 2 at Item (56), References Cited,
"English language Abstract of JP 2000-304554 Sakata et al. "A Proposed Location-Aware Notification Service". Information Processing Society. Japan, SIT Technical Reports on Mobile Computing and Wireless Communication, 2000-MBL-15-10, vol. 2000, No. 112, pp. 78-80. Dec. 2000." should be
--English language Abstract of JP 2000-304554.

Sakata et al. "A Proposed Location-Aware Notification Service", Information Processing Society. Japan, SIT Technical Reports on Mobile Computing and Wireless Communication, 2000-MBL-15-10, vol. 2000, No. 112, pp. 78-80. Dec. 2000.--.

Signed and Sealed this

Fourteenth Day of August, 2007

JON W. DUDAS
*Director of the United States Patent and Trademark Office*